(12) United States Patent
Kitagawa

(10) Patent No.: US 10,800,368 B2
(45) Date of Patent: Oct. 13, 2020

(54) VEHICLE OCCUPANT PROTECTION DEVICE, AIRBAG CONTROL METHOD, AND AIRBAG FOLDING METHOD

(71) Applicant: TOYOTA JIDOSHA KABUSHIKI KAISHA, Toyota-shi, Aichi-ken (JP)

(72) Inventor: Yuichi Kitagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

(21) Appl. No.: 16/008,692

(22) Filed: Jun. 14, 2018

(65) Prior Publication Data

US 2019/0023214 A1    Jan. 24, 2019

(30) Foreign Application Priority Data

Jul. 24, 2017   (JP) .................................. 2017-142988

(51) Int. Cl.

| | |
|---|---|
| *B60R 21/207* | (2006.01) |
| *B60R 21/237* | (2006.01) |
| *B60R 21/231* | (2011.01) |
| *B60R 21/2338* | (2011.01) |
| *B60R 21/00* | (2006.01) |

(52) U.S. Cl.

CPC .......... *B60R 21/207* (2013.01); *B60R 21/231* (2013.01); *B60R 21/237* (2013.01); *B60R 21/2338* (2013.01); *B60R 2021/0004* (2013.01); *B60R 2021/23107* (2013.01); *B60R 2021/23146* (2013.01)

(58) Field of Classification Search

CPC ... B60R 21/207; B60R 21/237; B60R 21/231; B60R 21/23138; B60R 2021/0004; B60R 2021/23107; B60R 2021/23146
USPC ........................ 280/730.2, 743.1, 730.1, 729
See application file for complete search history.

(56) References Cited

U.S. PATENT DOCUMENTS

| | | | | |
|---|---|---|---|---|
| 5,570,900 | A | * 11/1996 | Brown | .............. B60R 21/23138 280/729 |
| 2004/0169406 | A1 | 9/2004 | Yoshida | |
| 2004/0245750 | A1 | 12/2004 | Takimoto et al. | |
| 2016/0052477 | A1 | * 2/2016 | Tobata | .................. B60R 21/207 280/730.1 |

FOREIGN PATENT DOCUMENTS

| | | |
|---|---|---|
| CN | 1547536 A | 11/2004 |
| JP | H09-39625 A | 2/1997 |
| JP | H09-086329 A | 3/1997 |
| JP | 2004-314797 A | 11/2004 |

(Continued)

*Primary Examiner* — Keith J Frisby
(74) *Attorney, Agent, or Firm* — Oliff PLC

(57) ABSTRACT

A pair of first airbags and a pair of second airbags are stowed in opposing regions of side wall portions of a vehicle seat. The first airbags are positioned at a seat front side relative to a shoulder area of a seat occupant in a seat side view. The second airbags are positioned at the seat front side relative to a waist area of the seat occupant in the seat side view. The pair of first airbags and the pair of second airbags are supplied with gas, inflate and expand towards the seat width direction inner sides thereof, and are structured such that each pair of airbags, in the inflated and expanded states thereof, push against one another at a seat width direction middle side of the vehicle seat.

10 Claims, 20 Drawing Sheets

(56) References Cited

FOREIGN PATENT DOCUMENTS

| JP | 2006-111213 A | 4/2006 |
|----|---------------|--------|
| JP | 2008-114631 A | 5/2008 |
| JP | 2009-056836 A | 3/2009 |
| JP | 2009-154812 A | 7/2009 |
| JP | 2016-043813 A | 4/2016 |

* cited by examiner

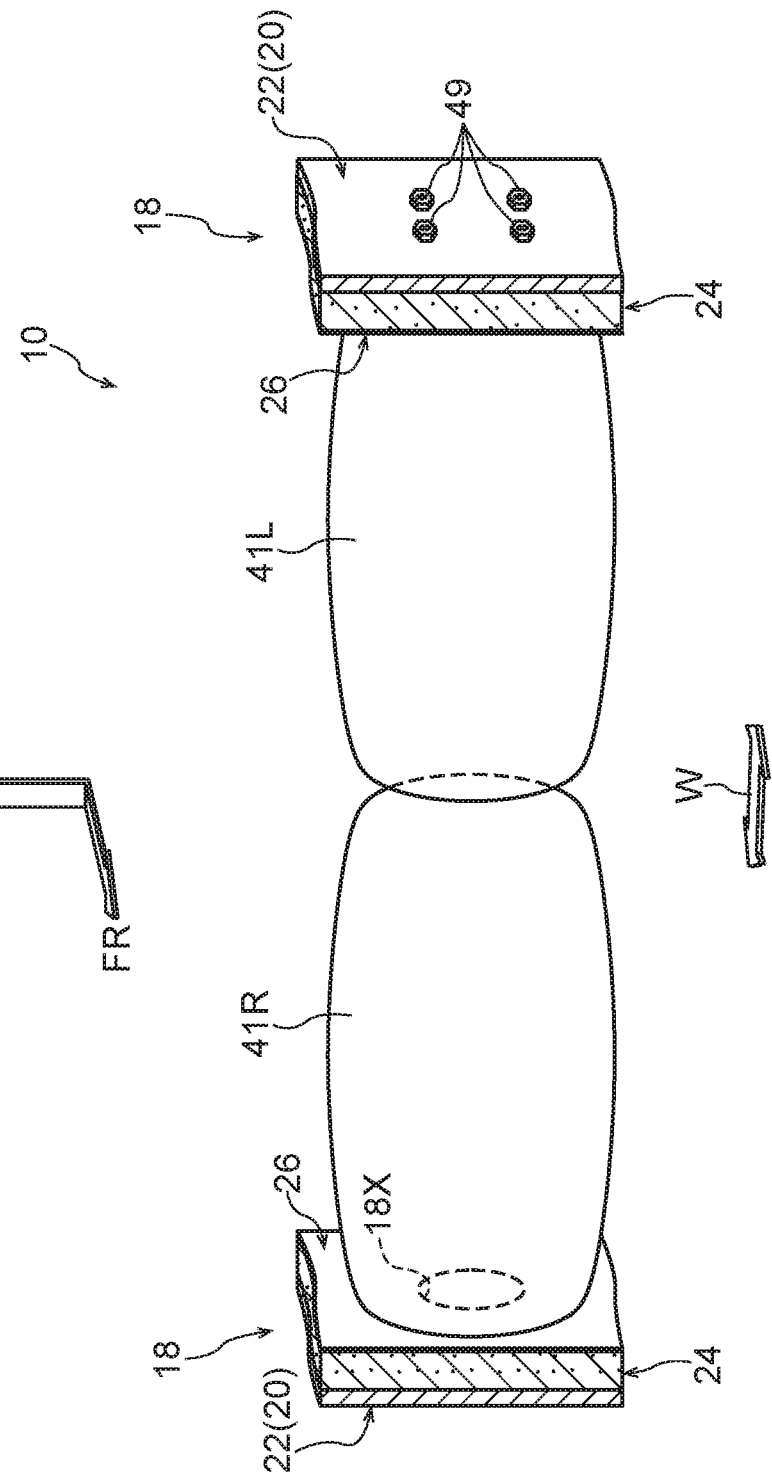

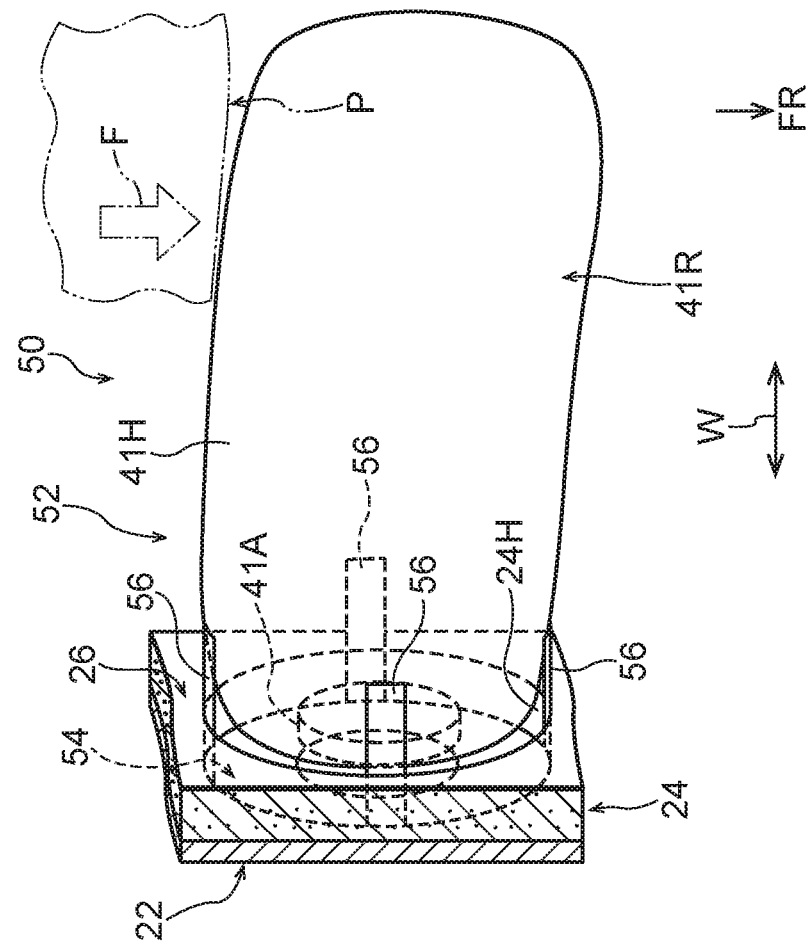

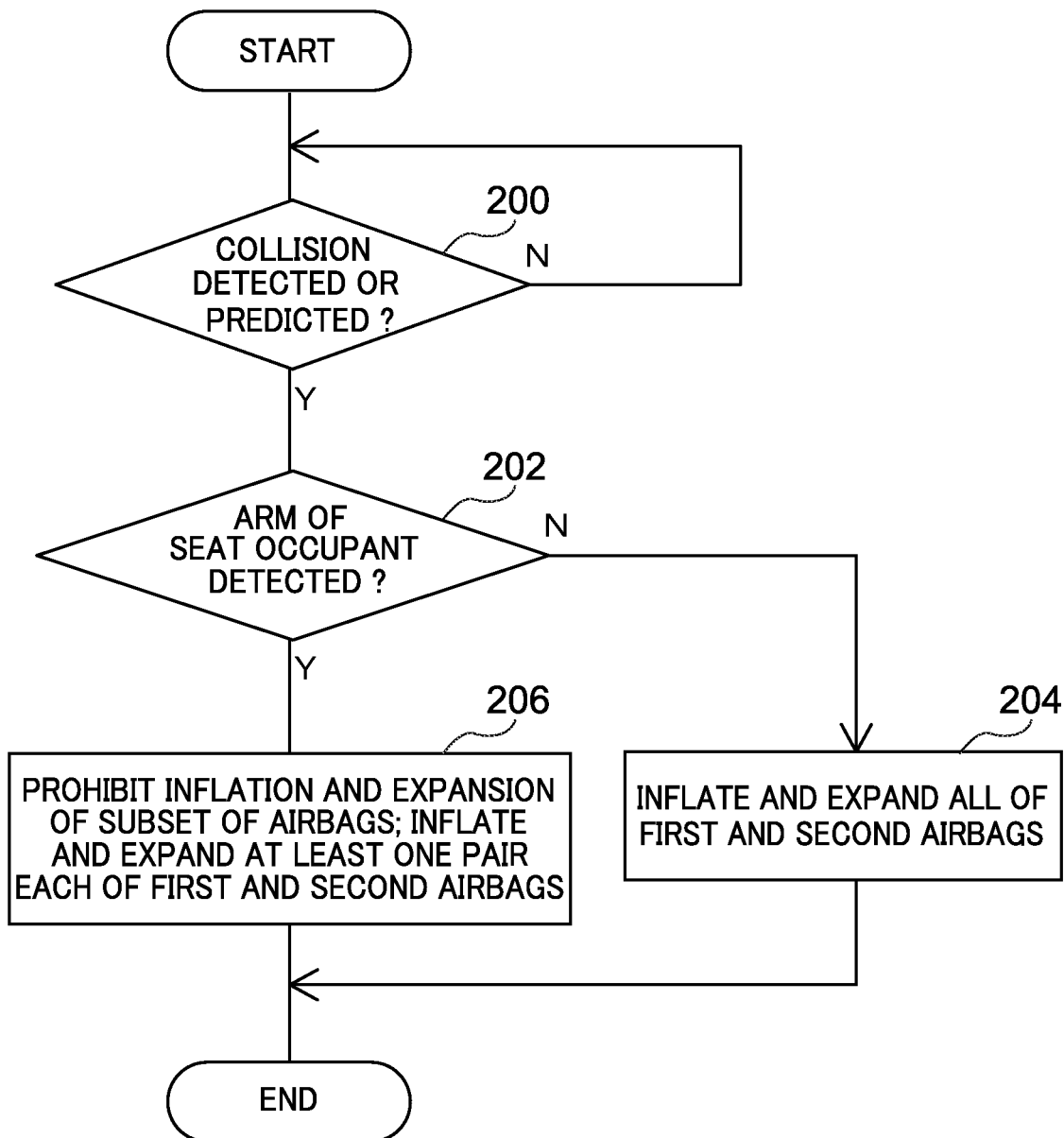

VEHICLE OCCUPANT PROTECTION DEVICE, AIRBAG CONTROL METHOD, AND AIRBAG FOLDING METHOD

CROSS-REFERENCE TO RELATED APPLICATION

This application claims priority under 35 USC 119 from Japanese Patent Application No. 2017-142988, filed on Jul. 24, 2017, the disclosure of which is incorporated by reference herein.

BACKGROUND

Technical Field

The present disclosure relates to a vehicle occupant protection device, an airbag control method, and an airbag folding method.

Related Art

Many kinds of devices equipped with airbags are known (see Japanese Patent Application Laid-Open (JP-A) Nos. 2009-56836, H9-39625, 2004-314797 and 2008-114631). For example, JP-A No. 2009-56836 discloses an occupant restraint device equipped with an airbag. In this occupant restraint device, when a collision is predicted, plural baseplates project from front face sides of side bolsters at the left and right of a seatback. Then, if the collision is detected within a predetermined duration, airbags inflate from distal end portions of the baseplates towards sides thereof at which an occupant is located, sandwiching the torso area of the occupant from left and right so as to restrain the torso area. JP-A No. H9-39625 discloses a child safety seat for a car that is equipped with an airbag. In this child safety seat for a car, when a collision occurs, respective airbags inflate toward the front from a pair of seat side walls. A belt whose two ends are fixed to the seat is connected to outer faces of the airbags. The belt retains the pair of airbags from the front. Thus, a child occupant is protected.

However, because a structure based on the conventional technology recited in JP-A No. 2009-56836 is a structure in which the airbags restrain an occupant by sandwiching the occupant from left and right, it is possible that the occupant may slip through between the left and right airbags. Thus, there is scope for improvement. Moreover, in a structure based on the conventional technology recited in JP-A No. H9-39625, the waist area of an occupant is held by the airbags when a collision occurs. Therefore, if a similar structure were applied to a seat on which an adult occupant sits, the adult occupant having a larger weight of the lower half of the body than a child occupant, the lower half of the adult occupant might slip through at the lower side of the airbags. Thus, there is scope for improvement.

SUMMARY

The present disclosure provides a vehicle occupant protection device, an airbag control method, and an airbag folding method that may improve restraint of a seat occupant who moves toward a seat front side due to inertia when a collision occurs.

A first aspect of the present disclosure includes: a vehicle occupant protection device including: a vehicle seat including a seat cushion and a seatback, the vehicle seat including side wall portions that protrude from both seat width direction outer side end portions of the seatback, toward a seat front side to positions at the seat front side relative to a shoulder area and a waist area of a seat occupant in a seat side view; a pair of first airbags respectively stowed in opposing regions of the pair of side wall portions of the vehicle seat, and positioned at the seat front side relative to the shoulder area of the seat occupant, in the seat side view; and a pair of second airbags respectively stowed in opposing regions of the pair of side wall portions of the vehicle seat, and positioned at the seat front side relative to the waist area of the seat occupant, in the seat side view, wherein the first airbags and the second airbags are supplied with gas and are inflated and expanded toward the seat width direction inner sides thereof, and, in inflated and expanded states, each pair of airbags push against one another at the seat width direction middle side of the vehicle seat.

According to the structure described above, the side wall portions of the vehicle seat project to the seat forward side to the positions at the seat front side relative to the shoulder area and waist area of the seat occupant in the seat side view; the pair of first airbags and the pair of second airbags are stowed in the opposing regions of the pair of side wall portions. The pair of first airbags are positioned at the seat front side relative to the shoulder area of the seat occupant in the side view, and the pair of second airbags are positioned at the seat front side relative to the waist area of the seat occupant in the side view. The pair of first airbags and the pair of second airbags receive supplies of gas and are inflated, and expanded towards the seat width direction inner sides thereof. The pairs of airbags in the inflated and expanded states each push together one against the other at the seat width direction middle side of the vehicle seat. Therefore, if the first airbags and second airbags are inflated and expanded as described above, for example, when a front collision of the vehicle is detected or predicted, then if the seat occupant moves due to inertia, the progress direction side of the seat occupant is blocked by the first airbags and the second airbags. Left and right shoulder areas of the seat occupant moving toward the seat front side due to inertia abut against the first airbags, and left and right waist areas of the seat occupant abut against the second airbags. As a result, movement of the seat occupant due to inertia may be inhibited effectively.

In a second aspect of the present disclosure, in the first aspect described above, each of the first airbags and the second airbags may include a main body portion and a gas entry portion that protrudes from a portion of the main body portion and structures a proximal end portion side; a diameter of the main body portion may be larger than a diameter of the gas entry portion; and a tilt suppression member may be provided at each airbag, the tilt suppression member connecting the proximal end side of the main body portion with a side of the side wall portion of the vehicle seat at which a frame is disposed, and the tilt suppression member suppressing, by tension, tilting of a region at the proximal end side of the main body portion, when the main body portion in an inflated and expanded state is subjected to a load from the side thereof at which the seat occupant is located.

According to the second aspect described above, the first airbags and the second airbags are each specified with the diameter of the main body portion being larger than the diameter of the gas entry portion. Therefore, the airbags may brace the seat occupant in a state in which each airbag is inflated to be larger by an amount corresponding to the difference in diameters. The proximal end side of each main body portion is joined to the side of the side wall portion of the vehicle seat at which the frame is disposed by the tilt suppression member. When the main body portion in the inflated and expanded state is subjected to a load from the side thereof at which the seat occupant is located, the tilt suppression member suppresses tilting of the region at the proximal end side of the main body portion by tension. Consequently, in the inflated and expanded states of the first airbags and the second airbags, movement of the seat occupant toward the seat front side due to inertia may be inhibited by the first airbags and the second airbags effectively.

In a third aspect of the present disclosure, in the second aspect described above, the tilt suppression member may include plural tethers being provided at one of a ring base, each tether may include one end joined to a portion at the proximal end side of the main body portion and another end fixed to the frame of the side wall portion of the vehicle seat via the ring base.

According to the third aspect, the tether that serves as the tilt suppression member is plurally provided at the one ring base. One end of each tether is joined to a region at the proximal end side of the main body portion, and the other end of each tether is fixed, via the ring base, to the frame at the side wall portion of the vehicle seat. Therefore, ease of assembly is better than in a structure in which the respective other ends of plural tethers are fixed directly to a frame of a side wall portion of a vehicle seat. Moreover, because the ring base is employed, weight is restrained compared to a structure in which a non-annular circular plate-shaped seat is employed instead of the ring base.

In a fourth aspect of the present disclosure, in the aspects described above, each of the first airbags and the second airbags may include an angled surface formed such that respective regions of the airbags that push against one another in the seat width direction in inflated and expanded states make contact at an angle.

According to the fourth aspect described above, the pair of first airbags and the pair of second airbags respectively make contact in the inflated and expanded states with the regions thereof that push against one another in the seat width direction at angles. Therefore, contact areas between the airbags are larger and the airbags are harder to separate from one another. Consequently, a retention strength for retaining a seat occupant from moving toward the seat front side due to inertia, may be increased.

In a fifth aspect of the present disclosure, in the aspects described above, hook and loop fasteners may be provided at each of the first airbags and the second airbags, the hook and loop fasteners may connect respective regions of the airbags that push against one another in the seat width direction in the inflated and expanded states.

According to the fifth aspect described above, when the first airbags and the second airbags are inflated and expanded, because the regions that push against one another are connected by the hook and loop fasteners, the airbags are harder to separate from one another. Consequently, a retention strength for retaining a seat occupant from moving toward the seat front side due to inertia, may be increased.

A sixth aspect of the present disclosure, in the aspects described above, may further include a pair of third airbags respectively stowed at lower portions of the pair of side wall portions of the vehicle seat, the pair of third airbags being supplied with gas and inflated and expanded towards the seat width direction inner sides thereof at the front side of a knee area of the seat occupant.

According to the sixth aspect described above, the pair of third airbags stowed in the respective lower portions of the pair of side wall portions of the vehicle seat receive supplies of gas and are inflated and expanded towards the seat width direction inner sides thereof at the front side of the knee area of the seat occupant. Consequently, movement of the knee area of the seat occupant toward the seat front side due to inertia when a collision occurs is inhibited by the third airbags.

A seventh aspect of the present disclosure, in the aspects described above, may further include an auxiliary airbag stowed in the vehicle seat, the auxiliary airbag being supplied with gas and inflated and expanded into a gap between the vehicle seat and the seat occupant.

According to the seventh aspect described above, the auxiliary airbag stowed in the vehicle seat receives a supply of gas and is inflated and expanded into the gap between the vehicle seat and the seat occupant. Consequently, the seat occupant may be retained in the vehicle seat in any of various collision modes.

An eighth aspect of the present disclosure is an airbag control method for a vehicle occupant protection device according to the first aspect, wherein the vehicle occupant protection device includes: at least two pairs each of the first airbags and the second airbags; and sensors, provided at the side wall portions, that detect a location of an arm of the seat occupant in pre-specified expected inflation and expansion regions, among plural expected inflation and expansion regions of the first airbags and the second airbags, the airbag control method including: in a first case in which the sensors do not detect the arm of the seat occupant in any of the plural expected inflation and expansion regions when a front collision of the vehicle is detected or predicted, inflating and expanding all of the first airbags and the second airbags; and in a second case in which the sensors detect the arm of the seat occupant in at least one of the expected inflation and expansion regions when a front collision of the vehicle is detected or predicted, in accordance with a pre-specified standard: prohibiting inflation and expansion of at least one of the first airbags and second airbags in whose expected inflation and expansion regions the arm of the seat occupant is detected, and inflating and expanding at least one pair of the first airbags and at least one pair of the second airbags. Note that the meaning of the term "arm of the seat occupant" in the eighth aspect is intended to include all of limbs projecting from the shoulder area of the seat occupant.

According to the eighth aspect described above, if the sensors do not detect the arms of the seat occupant in any of the plural expected inflation and expansion regions when a front collision of the vehicle is detected or predicted, all of the first airbags and the second airbags are inflated and expanded. Alternatively, if an arm of the vehicle occupant is detected in one or more of the plural expected inflation and expansion regions when a front collision of the vehicle is detected or predicted, then, in accordance with the pre-specified standard, inflation and expansion is prohibited for one or more of the first airbags and second airbags in whose expected inflation and expansion regions the arm of the vehicle occupant is detected, but at least one pair of the first airbags and at least one pair of the second airbags are inflated and expanded. Accordingly, even while interference between the airbags and the arms of the seat occupant is strongly suppressed, a retention strength of the seat occupant by the airbags is assured.

A ninth aspect of the present disclosure, in the eighth aspect described above, may include: in the second case, and in a case in which at least one pair of the first airbags can be inflated and expanded even when all of the first airbags in whose expected inflation and expansion regions the arm of the seat occupant is detected are prohibited to inflate and expand: prohibiting inflation and expansion of all of the first airbags in whose expected inflation and expansion regions the arm of the seat occupant is detected; and inflating and expanding the others of the first airbags, and in the second case, and in a case in which at least one pair of the second airbags can be inflated and expanded even when all of the second airbags in whose expected inflation and expansion regions the arm of the seat occupant is detected are prohibited to inflate and expand: prohibiting inflation and expansion of all of the second airbags in whose expected inflation and expansion regions the arm of the seat occupant is detected; and inflating and expanding the others of the second airbags.

According to the ninth aspect described above, if at least one pair of the first airbags may be inflated and expanded even when inflation and expansion is prohibited for all of the first airbags in whose expected inflation and expansion regions an arm of the seat occupant is detected, inflation and expansion is prohibited for all of the first airbags in whose expected inflation and expansion regions an arm of the seat occupant is detected. Furthermore, if at least one pair of the second airbags may be inflated and expanded even when inflation and expansion is prohibited for all of the second airbags in whose expected inflation and expansion regions an arm of the seat occupant is detected, inflation and expansion is prohibited for all of the second airbags in whose expected inflation and expansion regions an arm of the seat occupant is detected. Therefore, interference between the airbags and the arms of the seat occupant may be suppressed effectively.

A tenth aspect of the present disclosure is an airbag folding method for an airbag provided at a vehicle occupant protection device according to the first aspect, the airbag configured to be inflated and expanded toward a seat width direction inner side along a long side direction of a flat unfolded state of the airbag, the airbag folding method including: from the flat unfolded state, folding an end portion side in a short side direction of the airbag to the inner side in the short side direction; and after the folding to the inner side, folding the airbag into a roll shape from a distal end side toward a proximal end side in the long side direction.

According to the tenth aspect described above, firstly, in the flat unfolded state prior to folding, the end portion sides of the short side direction of the airbag are folded to the inner sides in the short side direction. Then, the airbag subsequent to that first step is folded into a roll shape from the distal end side toward the proximal end side of the long side direction. When the airbag that has been folded in this manner receives a supply of gas, the airbag inflates toward the seat width direction inner side at the seat front side of the seat occupant and then expands to a predetermined volume.

As described hereabove, according to the vehicle occupant protection device of the first aspect, restraint of a seat occupant from moving toward the seat front side due to inertia when a collision occurs, may be improved.

According to the vehicle occupant protection device of the second aspect, even when the main body portions of the airbags are pushed by the seat occupant, tilting of the main body portions is suppressed by the tilt suppression members. Thus, movement of the seat occupant toward the seat front side due to inertia may be inhibited effectively.

According to the vehicle occupant protection device of the third aspect, plural tethers may be attached easily while weight is restrained, with a simple structure.

According to the vehicle occupant protection device of the fourth aspect, because contact areas between the airbags are enlarged, a case of a seat occupant moving toward the seat front side due to inertia, slipping through between the airbags, may be more effectively suppressed.

According to the vehicle occupant protection device of the fifth aspect, because the airbags are connected to one another by the hook and loop fasteners, a case of a seat occupant moving toward the seat front side due to inertia, slipping through between the airbags, may be more effectively suppressed.

According to the vehicle occupant protection device of the sixth aspect, because the third airbags are additionally provided, retention strength of the lower half of the seat occupant may be improved.

According to the vehicle occupant protection device of the seventh aspect, retention strength of the seat occupant may be improved in regard to a variety of collision modes.

According to the airbag control method of the eighth aspect, restraint of a seat occupant when a collision occurs may be improved while interference between the airbags and the arms of the seat occupant may be strongly suppressed.

According to the airbag control method of the ninth aspect, interference between the airbags and the arms of the seat occupant may be suppressed effectively.

According to the airbag folding method of the tenth aspect, when the folded airbag is supplied with gas in the vehicle occupant protection device according to the first aspect, regions at the inflation distal end sides of the airbags that form a pair may be abutted together more promptly.

BRIEF DESCRIPTION OF THE DRAWINGS

Exemplary embodiments will be described in detail based on the following figures, wherein:

FIG. 2 is an enlarged perspective diagram showing an enlargement of an abutted state between first airbags in FIG. 1;

FIG. 8 is a perspective diagram, viewed from a seat upper side, showing a state in which a main body portion of the first airbag in FIG. 5 is subjected to a load from a side thereof at which a seat occupant is located;

FIG. 15 is a flowchart showing details of inflation and expansion control processing of airbags of the vehicle occupant protection device in FIG. 13.

DETAILED DESCRIPTION

First Exemplary Embodiment

A vehicle occupant protection device according to a first exemplary embodiment of the present disclosure is described using FIG. 1 to FIG. 4. An arrow FR that is shown as appropriate in these drawings indicates a seat front side, an arrow UP indicates a seat upper side, and an arrow W indicates a seat width direction. Herebelow, where descriptions are given simply using the directions front, rear, up, down, left and right, unless particularly specified, these represent the front and rear in the seat front-and-rear direction, up and down in the seat vertical direction, and left and right when facing toward the seat front side.

Figure 1:
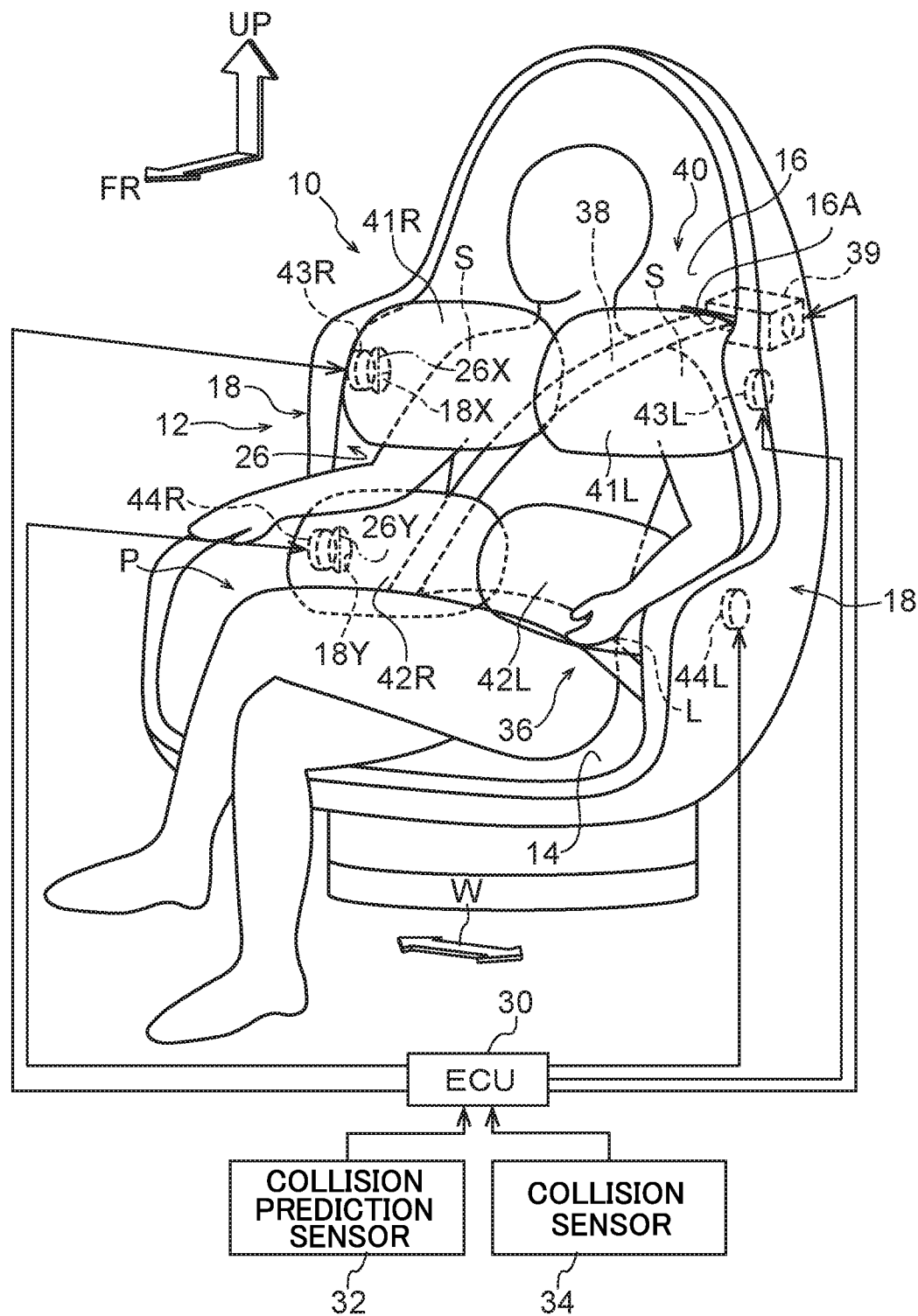
FIG. 1 is a perspective diagram showing a vehicle occupant protection device according to a first exemplary embodiment of the present disclosure in a state in which airbags have inflated and expanded.

As shown in FIG. 1, a vehicle occupant protection device 10 according to the present exemplary embodiment includes a vehicle seat 12, a seatbelt apparatus 36 and an airbag apparatus 40. The seat front-and-rear direction of the vehicle seat 12 according to the present exemplary embodiment matches a vehicle front-and-rear direction, and a seat width direction of the vehicle seat 12 matches a vehicle width direction. The vehicle seat 12 includes a seat cushion 14 and a seatback 16.

The drawings illustrate a state in which a crash test dummy (a mannequin) P that serves as a model of a vehicle occupant who is to be protected is seated on the seat cushion 14 of the vehicle seat 12. The dummy P is, for example, a WorldSID (World Side Impact Dummy) AM50 dummy (representing the 50th percentile of American adult males). Below, in order to facilitate understanding of the descriptions, the dummy P is referred to as "the seat occupant P".

The seat cushion 14 is a region that supports the buttock area and thigh area of a seat occupant P. The seatback 16 is a region that supports the back area and head area of the seat occupant P in the present exemplary embodiment. That is, the seatback 16 according to the present exemplary embodiment extends to a height position at the upper side relative to the head area of the seat occupant P. The vehicle seat 12 further includes side wall portions 18 that protrude towards the seat front side from both of seat width direction outer side end portions of the seatback 16. The pair of left and right side wall portions 18 are formed in step shapes in a seat side view and protrude to positions at the seat front side relative to the shoulder area S and waist area L of the seat occupant P in the seat side view (not shown in the drawings).

As shown in FIG. 2, a side frame 22 that serves as a frame is provided at each of the left and right side wall portions 18. The pair of left and right side frames 22 serve as portions of a seat frame 20, which is a framework of the vehicle seat 12 (see FIG. 1), and constitute framework portions of the side wall portions 18. The pair of left and right side frames 22 are structured by, for example, metal plates. Rear end sides and lower end sides of the pair of left and right side frames 22 are connected in the seat width direction by connecting members of a connecting frame or the like, which is not shown in the drawings.

A cushion pad (a cushion material) 24 formed of a foam body such as a urethane pad or the like is mounted at the seat width direction inner sides relative to the side frames 22. Cushion pads similar to the cushion pad 24 are mounted to frames of the seat frame 20 other than the side frames 22 at the sides of the seat occupant P (see FIG. 1). A surface of the cushion pad 24 is covered with a seat skin 26 (also referred to as a surface layer material).

As shown in FIG. 1, the seatbelt apparatus 36 is mounted at the vehicle seat 12. The seatbelt apparatus 36 is formed as a 3-point seatbelt apparatus, in which a belt (webbing) 38 may be pulled out through a feed aperture 16A formed in the seatback 16. In the present exemplary embodiment, the feed aperture 16A is positioned at the upper side of the left shoulder area S of the seat occupant P. One end of the belt 38 that passes through the feed aperture 16A and is inserted into the seatback 16 is taken up onto a retractor 39 to be capable of being pulled out. In the present exemplary embodiment, the other end of the belt 38 is fixed to an anchor, which is not shown in the drawings, provided at the left side of a rear portion of the seat cushion 14. A tongue plate (not shown in the drawings) is slidably provided on the belt 38. In the present embodiment, by the tongue plate being anchored at a buckle (not shown in the drawings) provided at the right side of the rear portion of the seat cushion 14, the belt 38 is worn by the seat occupant P.

The retractor 39 of the seatbelt apparatus 36 is equipped with a pretensioner (not shown in the drawings) that forcibly applies tension to the belt 38 when activated. Activation of the pretensioner is controlled by an electronic control unit (ECU) 30, which is described below.

The airbag apparatus 40 includes a pair of left and right first airbags 41R and 41L for protecting the shoulder area of the seat occupant P, and a pair of left and right second airbags 42R and 42L for protecting the waist area of the seat occupant P. The first airbags 41R and 41L and the second airbags 42R and 42L are formed in bag shapes by plural numbers of panels being sewn together. The panels are formed by cutting out base cloths of, for example, nylon, polyester or the like. In the present exemplary embodiment, in consideration of costs, airbags all of the same sizes are employed for the first airbags 41R and 41L and the second airbags 42R and 42L. However, airbags of different sizes may be employed. Inflators 43R and 43L are connected to the first airbags 41R and 41L, and inflators 44R and 44L are connected to the second airbags 42R and 42L.

The inflators 43R, 43L, 44R and 44L are gas generation devices, which are structured so as to jet out gas when a front collision of the vehicle is detected or predicted. Each of the inflators 43R, 43L, 44R and 44L is fixed inside a cylindrical retainer 46 (see FIG. 3D). A flange 46F of the retainer 46 shown in FIG. 3D is fixed by fastening, using bolts (not shown in the drawings) and nuts 49, to the side frame 22 of the side wall portion 18 shown in FIG. 2. The retainer 46 is accommodated inside an insertion hole that is formed to penetrate through the cushion pad 24 (and that opens out at an airbag expansion aperture 18X in the drawings). Thus, even though the retainer 46 is disposed at the side wall portion 18 (see FIG. 3A to FIG. 3D), each side wall portion 18 is structured so as not to form a protrusion to the seat width direction inner side due to the disposition of the retainer 46 during usual use. Activation of the inflators 43R, 43L, 44R and 44L shown in FIG. 1 is controlled by the ECU 30, which is described below.

The first airbags 41R and 41L are stowed in respective folded states in opposing regions of the pair of side wall portions 18 of the vehicle seat 12. The first airbags 41R and 41L are positioned at the seat front side relative to the shoulder area S of the seat occupant P in the seat side view (not shown in the drawings). The airbag expansion apertures 18X are formed at the seat width direction inner sides of the side wall portions 18 to correspond with the stowing regions of the first airbags 41R and 41L. Cut portions 26X (depicted by imaginary lines in the drawings) are formed in the seat skin 26 covering the airbag expansion apertures 18X. Each cut portion 26X is discontinuously formed in a direction linking upper and lower ends of the airbag expansion aperture 18X. The cut portions 26X are specified to facilitate inflation and expansion of the first airbags 41R and 41L.

The inflators 43R and 43L are fixed at the sides thereof at which the side frames 22 mentioned above are disposed (see FIG. 2). When the inflators 43R and 43L are activated, the inflators 43R and 43L generate gas and supply the gas into the first airbags 41R and 41L. The pair of first airbags 41R and 41L, receiving the supplies of gas from the inflators 43R and 43L, inflate and expand through the airbag expansion apertures 18X towards the seat width direction inner sides thereof at the seat front side relative to the seat occupant P. The first airbags 41R and 41L that together form a pair are structured so as to push against one another at the seat width direction middle side of the vehicle seat 12 in the inflated and expanded states thereof.

The second airbags 42R and 42L are stowed in respective folded states in opposing regions of the pair of side wall portions 18 of the vehicle seat 12. The second airbags 42R and 42L are positioned at the seat front side relative to the waist area L of the seat occupant P in the seat side view (not shown in the drawings). Airbag expansion apertures 18Y are formed at the seat width direction inner sides of the side wall portions 18 to correspond with the stowing regions of the second airbags 42R and 42L. Cut portions 26Y (depicted by imaginary lines in the drawings) are formed in the seat skin 26 covering the airbag expansion apertures 18Y. Each cut portion 26Y is discontinuously formed in a direction linking upper and lower ends of the airbag expansion aperture 18Y. The cut portions 26Y are specified to facilitate inflation and expansion of the second airbags 42R and 42L.

The inflators 44R and 44L are fixed at the sides thereof at which the side frames 22 mentioned above are disposed (see FIG. 2). When the inflators 44R and 44L are activated, the inflators 44R and 44L generate gas and supply the gas into the second airbags 42R and 42L. The pair of second airbags 42R and 42L, receiving the supplies of gas from the inflators 44R and 44L, inflate and expand through the airbag expansion apertures 18Y towards the seat width direction inner sides thereof at the seat front side relative to the seat occupant P. The second airbags 42R and 42L that together form a pair are structured so as to push against one another at the seat width direction middle side of the vehicle seat 12 in the inflated and expanded states thereof.

Although the cut portions 26X and 26Y are formed discontinuously as an example in the present exemplary embodiment, the cut portions 26X and 26Y may be formed continuously. Diameters of the airbag expansion apertures 18X and 18Y are formed slightly larger than the diameter of the flange 46F of the retainer 46 shown in the example in FIG. 3D, such that the whole of each retainer 46 can penetrate there through.

The seatbelt apparatus 36 and airbag apparatus 40 constituting the vehicle occupant protection device 10 shown in FIG. 1 are controlled by the ECU 30, which is a control device. The ECU 30 is electronically connected to the inflators 43R, 43L, 44R and 44L of the airbag apparatus 40 and to the pretensioner (not shown in the drawings) of the retractor 39 of the seatbelt apparatus 36. The ECU 30 is also electronically connected to a collision prediction sensor 32, such as a pre-crash sensor or the like, and a collision sensor 34 (or sensor group).

On the basis of signals from the collision prediction sensor 32, the ECU 30 may predict (an occurrence of or unavoidability of) a front collision in a variety of modes, such as a full overlap front collision against a car in which the ECU 30 is employed, an offset front collision and the like. The ECU 30 may also predict, on the basis of signals from the collision prediction sensor 32, (an occurrence of or unavoidability of) a side collision against the car in which the ECU 30 is employed.

When the ECU 30 predicts a front collision on the basis of signals from the collision prediction sensor 32 or detects a front collision on the basis of signals from the collision sensor 34, the ECU 30 controls to supply an activation current to the pretensioner (not shown in the drawings) of the retractor 39, and to supply activation currents to the inflators 43R, 43L, 44R and 44L, which activates the inflators 43R, 43L, 44R and 44L. When the pretensioner is activated, tension is applied to the belt 38 and the seat occupant P is restrained against the seatback 16. Meanwhile, when the inflators 43R, 43L, 44R and 44L are activated, the first airbags 41R and 41L and the second airbags 42R and 42L are inflated and expanded.

Now, a folding method of each of the airbags (the first airbags 41R and 41L and the second airbags 42R and 42L) is described with reference to FIG. 3. The each airbag is to be equipped to the vehicle occupant protection device 10 and is to be inflated and expanded toward the seat width direction inner side along a long side direction of a flat unfolded state thereof (see arrow 48L in FIG. 3A). An airbag of the same size and same shape as the first airbags 41R and 41L and second airbags 42R and 42L shown in FIG. 1 is indicated with the reference symbol 48 in FIG. 3. The airbag 48 includes a main body portion 48H and a gas entry portion 48A. The gas entry portion 48A protrudes from a portion (a middle portion of a short side direction) at one long side direction end portion of the main body portion 48H and structures a proximal end portion side of the airbag 48. The airbag 48 is specified with a diameter of the main body portion 48H being larger than a diameter of the gas entry portion 48A.

Figure 3A:
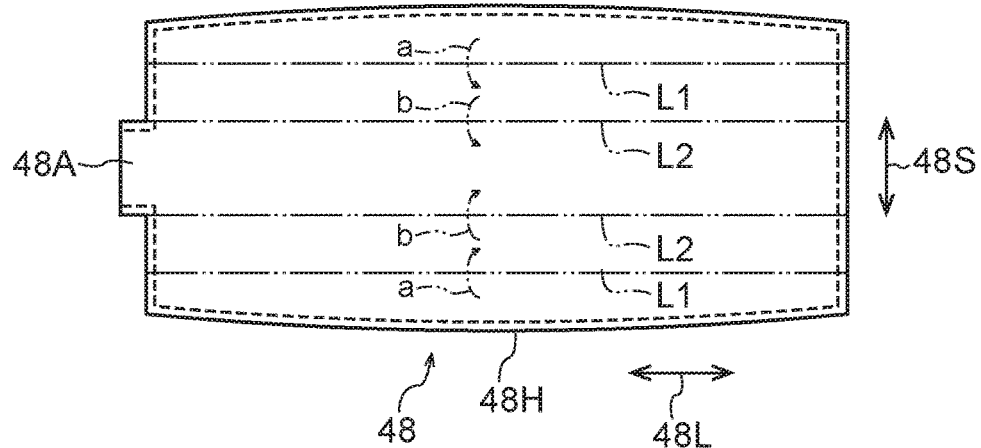
FIG. 3A to FIG. 3D are schematic diagrams describing a folding method of an airbag in FIG. 1.

In a first step, as illustrated in FIG. 3A, end portion sides of the short side direction (see arrow 48S) of the airbag 48 in the flat unfolded state prior to folding are folded to the inner sides in the short side direction. In the present exemplary embodiment, the end portion sides of the short side direction of the airbag 48 are folded plural times towards the short side direction middle side of the airbag 48 (see arrows a and b) at fold lines L1 and L2 that run along the long side direction of the airbag 48 (see arrow 48L), to form the state shown in FIG. 3B. The end portion sides of the short side direction are folded such that the inner sides of the folds are at a side of the airbag 48 that is to face to the opposite side from the side thereof that faces the seat occupant P in the inflated and expanded state of the airbag 48 (see FIG. 1).

Figure 3B:
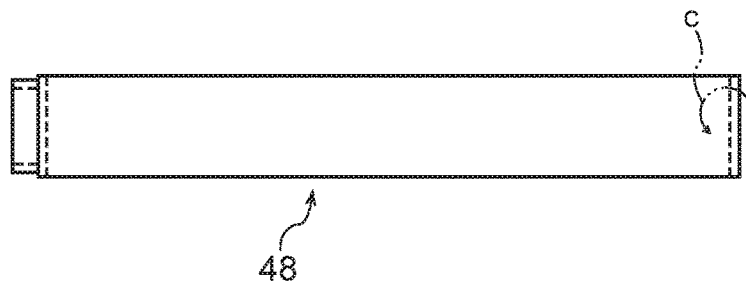
Figure 3C:
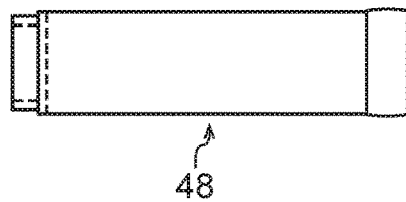
Figure 3D:
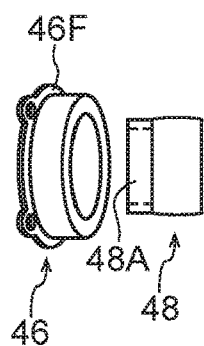

In a second step after the first step, as shown in FIG. 3B to FIG. 3D, the airbag 48 is folded into a roll shape from a distal end side of the long side direction (the right side in FIG. 3A to FIG. 3D) toward a proximal end side (see arrow c in FIG. 3B). In the present exemplary embodiment, the airbag 48 is folded into the roll shape such that the inner side of the roll is the side of the airbag 48 that is to face to the opposite side from the side of the airbag 48 that faces the seat occupant P in the inflated and expanded state of the airbag 48 (see FIG. 1). As a result, the airbag 48 in the folded state shown in FIG. 3D is obtained. The airbag 48 in the folded state is stowed inside the retainer 46.

Now, operation and functions of the above exemplary embodiment are described.

The pair of first airbags 41R and 41L shown in FIG. 1 are positioned at the seat front side relative to the shoulder area S of the seat occupant P in the seat side view. The pair of first airbags 41R and 41L are supplied with gas, inflate and expand toward the seat width direction inner sides thereof, and push against one another at the seat width direction middle side of the vehicle seat 12. Meanwhile, the pair of second airbags 42R and 42L are positioned at the seat front side relative to the waist area L of the seat occupant P in the seat side view. The pair of second airbags 42R and 42L are supplied with gas, inflate and expand toward the seat width direction inner sides thereof, and push against one another at the seat width direction middle side of the vehicle seat 12.

Figure 4:
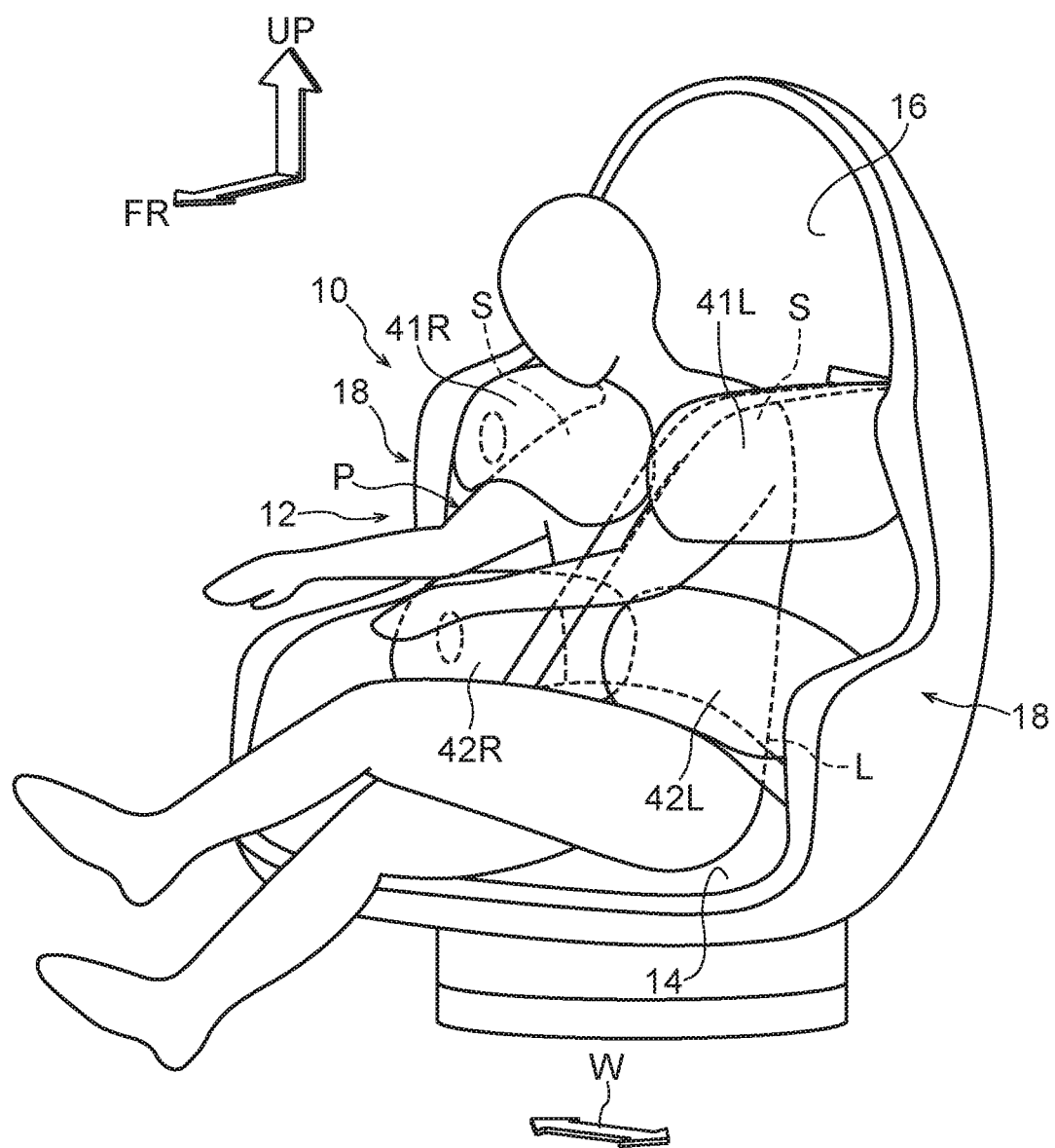
FIG. 4 is a perspective diagram showing a state of the first exemplary embodiment when a front collision occurs.

Consequently, when a front collision of the vehicle is detected or predicted and the first airbags 41R and 41L and second airbags 42R and 42L inflate and expand as described above, then if the seat occupant P moves due to inertia, as shown in FIG. 4, a progress direction side of the shoulder area S of the seat occupant P is blocked by the first airbags 41R and 41L, and the progress direction side of the waist area L of the seat occupant P moving due to inertia is blocked by the second airbags 42R and 42L. Left and right shoulder areas S of the seat occupant P, moving toward the seat front side due to inertia, abut against the first airbags 41R and 41L, and left and right waist areas L of the same seat occupant P abut against the second airbags 42R and 42L.

At this time, the first airbags 41R and 41L are subjected to forces from the shoulder areas S of the seat occupant P in a direction substantially orthogonal to the inflation and expansion directions of the first airbags 41R and 41L (that is, the directions in which the first airbags 41R and 41L push against one another); the first airbags 41R and 41L retain the shoulder areas S of the seat occupant P. Meanwhile, the second airbags 42R and 42L are subjected to forces from the waist areas L of the seat occupant P in a direction substantially orthogonal to the inflation and expansion directions of the second airbags 42R and 42L (that is, the directions in which the second airbags 42R and 42L push against one another); the second airbags 42R and 42L retain the waist areas of the seat occupant P. Thus, movement of the seat occupant P due to inertia may be inhibited effectively.

To expand on this explanation, the pair of first airbags 41R and 41L and the pair of second airbags 42R and 42L inflate to sides to approach one another from the sides in which each pair of airbags oppose one another, and push against one another. Therefore, even when the pair of first airbags 41R and 41L and the pair of second airbags 42R and 42L are at this time subjected to forces from the side thereof at which the seat occupant P is located, the first airbags 41R and 41L are not easily separated from one another and the second airbags 42R and 42L are not easily separated from one another. Consequently, a case of the seat occupant P moving toward the seat front side due to inertia, when a collision occurs, slipping through between the first airbags 41R and 41L and between the second airbags 42R and 42L, may be suppressed effectively.

Because the first airbags 41R and 41L and the second airbags 42R and 42L are specified with the diameters of the main body portions (see the main body portion 48H in FIG. 3A) being larger than the diameters of the gas entry portions (see the gas entry portion 48A in FIG. 3A), the airbags may brace the seat occupant P in a state in which each airbag is inflated to be larger by an amount corresponding to the difference in diameters.

As described above, according to the vehicle occupant protection device 10 according to the present exemplary embodiment, restraint of a seat occupant P moving toward the seat front side due to inertia when a collision occurs, may be improved.

In the present exemplary embodiment, the airbag 48 is folded through the first step and second step illustrated in FIG. 3A to FIG. 3D, described above. When the airbags 48 folded in this manner are arranged as the first airbags 41R and 41L and second airbags 42R and 42L of the vehicle occupant protection device 10 shown in FIG. 1 and are supplied with gas, the first airbags 41R and 41L and the second airbags 42R and 42L inflate towards the seat width direction inner sides thereof at the seat front side of the seat occupant P and then expand to predetermined volumes. Therefore, regions at the inflation distal end sides of the pair of first airbags 41R and 41L may be abutted together more promptly and regions at the inflation distal end sides of the pair of second airbags 42R and 42L may be abutted together more promptly.

Second Exemplary Embodiment

Figure 5:
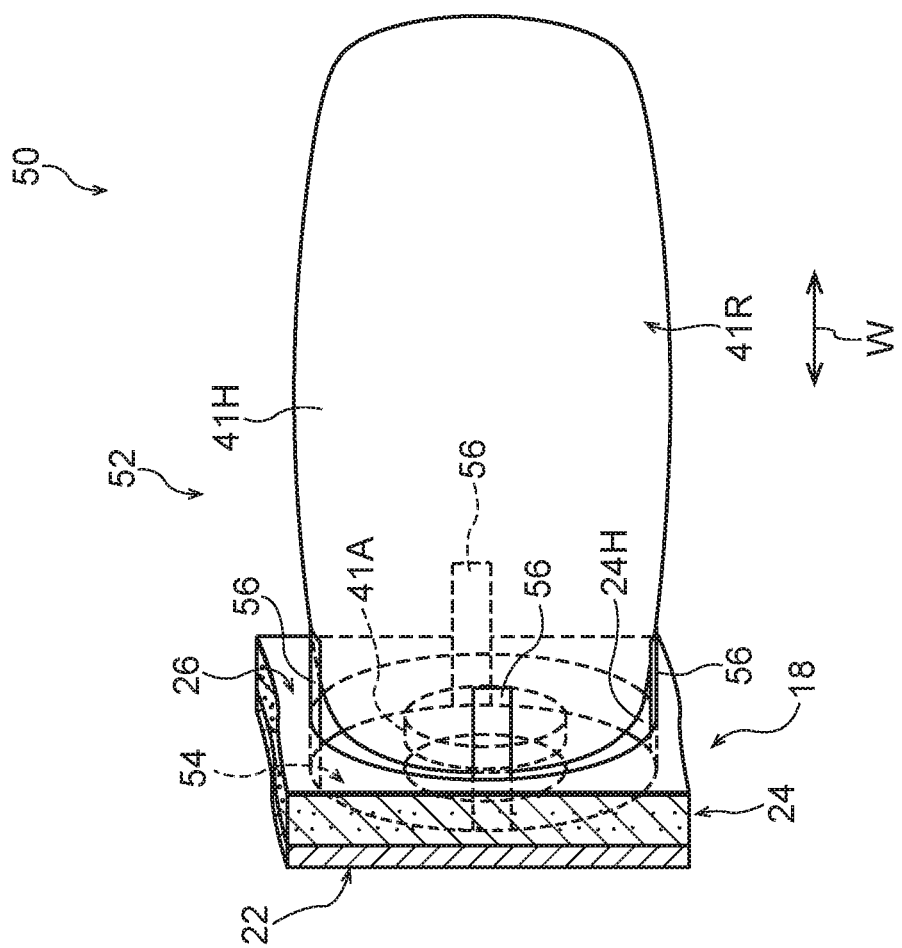
FIG. 5 is a perspective diagram showing a portion of a vehicle occupant protection device according to a second exemplary embodiment of the present disclosure in a state in which a first airbag at a seat right side has inflated and expanded.

Now, a vehicle occupant protection device according to a second exemplary embodiment of the present disclosure is described using FIG. 5 to FIG. 9. As shown in FIG. 5, a vehicle occupant protection device 50 according to the present exemplary embodiment differs from the vehicle occupant protection device 10 according to the first exemplary embodiment (see FIG. 1, etc.) in that a ring base 54 and tethers 56 are provided. The tethers 56 serve as tilt suppression members. Other structures are substantially the same as in the first exemplary embodiment except in the respects described below. Therefore, structural portions that are substantially the same as in the first exemplary embodiment are assigned the same reference numerals and are not described. An airbag apparatus 52 that constitutes a portion of the vehicle occupant protection device 50 according to the present exemplary embodiment has substantially the same structure as the airbag apparatus 40 according to the first exemplary embodiment (see FIG. 1) except in the respects described below.

FIG. 5 shows a perspective diagram of a state in which the first airbag 41R of the vehicle occupant protection device 50 according to the present exemplary embodiment has inflated and expanded. One end of each tether 56 is joined by sewing to a region (an upper or lower wall face or a front or rear wall face) at the proximal end side of a main body portion 41H of the first airbag 41R. A plural number of the tether 56 are provided (a total of four in the present exemplary embodiment). For example, the tethers 56 are provided at the main body portion 41H of the first airbag 41R, at the front and rear thereof in the seat front-and-rear direction and the upper and lower sides thereof in the seat vertical direction.

Figure 6A:
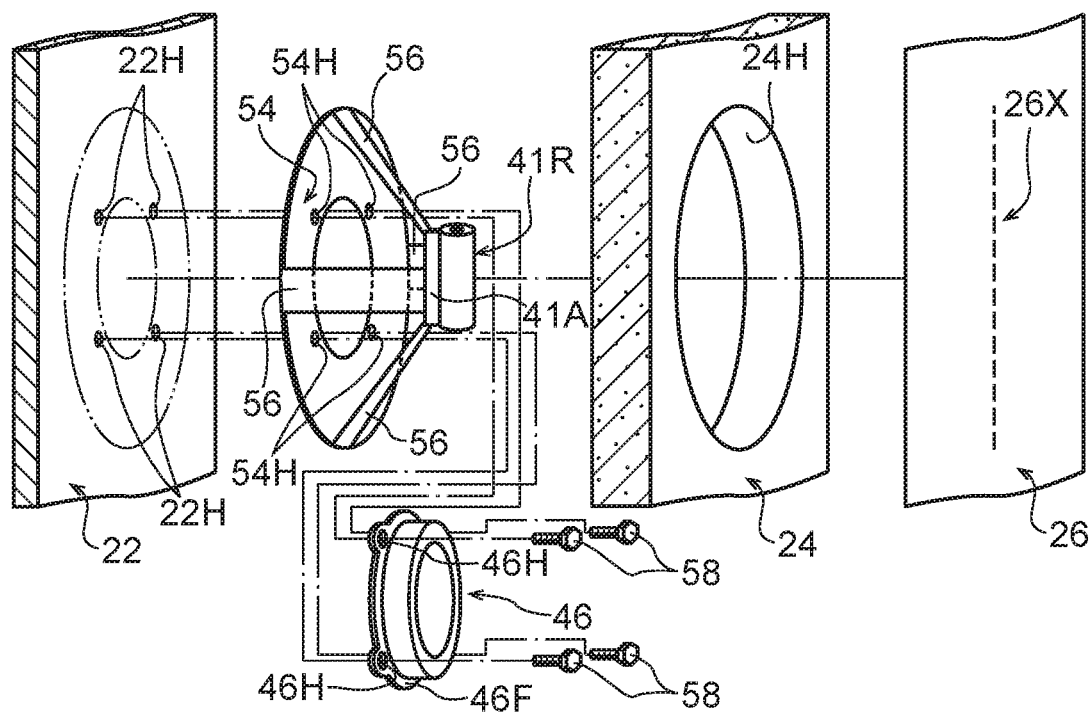
FIG. 6A to FIG. 6C are diagrams showing a stowing procedure of the airbag in FIG. 5.
Figure 6B:
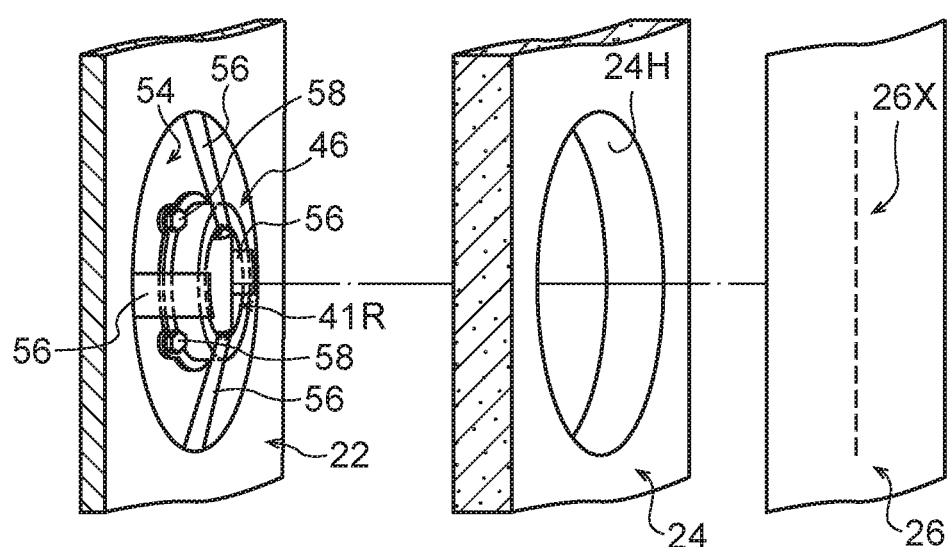
Figure 7:
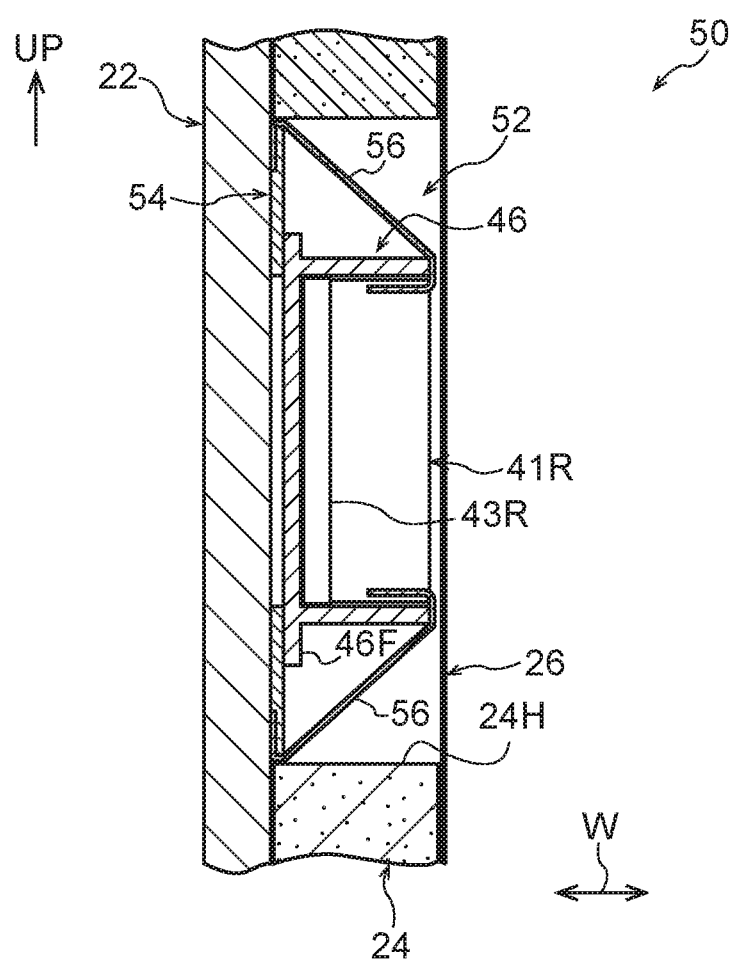
FIG. 7 is a vertical sectional diagram showing an enlargement of a state in which the first airbag in FIG. 5 has been stowed.

As shown in FIG. 6A and FIG. 7, the other ends of the four tethers 56 (end portions at the left side in the drawings) are respectively fixed to outer periphery portions of the same ring base 54. As shown in FIG. 6A, a plural number (a total of four in the present exemplary embodiment) of bolt insertion holes 54H are formed penetrating through the ring base 54. The bolt insertion holes 54H are positioned equidistant in a circumferential direction of the ring base 54. The bolt insertion holes 54H of the ring base 54 are positioned that correspond with bolt insertion holes 46H (of which only two are shown in the drawings) that are formed penetrating through the flange 46F of the retainer 46. Moreover, the bolt insertion holes 54H of the ring base 54 are positioned that correspond with bolt insertion holes 22H that are formed penetrating through the side frame 22. Bolts 58 penetrate through the bolt insertion holes 46H, 54H and 22H and are screwed into nuts (not shown in the drawings). Thus, as shown in FIG. 6B, the ring base 54 is fastened to the retainer 46 and to the side frame 22. That is, the other ends of the tethers 56 are fixed via the ring base 54 to the side frame 22 of the side wall portion 18 (each of which is shown in FIG. 1) of the vehicle seat 12.

Accordingly, as shown in FIG. 5, the four tethers 56 are connected to the proximal end side (the left side in the drawings) of the main body portion 41H of the first airbag 41R and are connected to the side of the side wall portion 18 of the vehicle seat 12 (see FIG. 1) at which the side frame 22 is disposed.

As shown in FIG. 6A, an insertion hole 24H is formed penetrating through the cushion pad 24. The ring base 54 and the retainer 46 are accommodated in the insertion hole 24H. An opening diameter of the insertion hole 24H (the diameter of an airbag expansion aperture) is slightly larger than an outer diameter of the ring base 54 and to be larger than the diameter of the airbag expansion aperture 18X according to the first exemplary embodiment (see FIG. 1). As shown in FIG. 5, during inflation and expansion of the main body portion 41H of the first airbag 41R, each tether 56 is pulled into a linear shape passing through the insertion hole 24H. Thus, by tension, the tethers 56 suppress tilting of a region at the proximal end side of the main body portion 41H of the first airbag 41R in the inflated and expanded state when, as illustrated in FIG. 8, the main body portion 41H is subjected to a load F from the side thereof at which the seat occupant P is located.

Although not shown in the drawings, tethers (56) are attached to the first airbag 41L and the second airbags 42R and 42L (each of which is shown in FIG. 1) in a similar manner to the first airbag 41R illustrated in FIG. 5. These tethers (56) are also fixed to the side frames 22 via ring bases (54). Insertion holes (24H) are formed penetrating through each cushion pad 24. The insertion holes (24H) accommodate the ring bases (54) that are connected via the tethers (56) to the first airbag 41L and second airbags 42R and 42L (each shown in FIG. 1). That is, structures of vicinities of the respective stowing regions of the first airbag 41L and the second airbags 42R and 42L (each shown in FIG. 1) are similar to the structure of the vicinity of the stowing region of the first airbag 41R.

Now, a stowing procedure of the first airbag 41R is described with reference to FIG. 6A to FIG. 6C. The first airbag 41L and the second airbags 42R and 42L (each shown in FIG. 1) are stowed by similar procedures.

The ring base 54 shown in FIG. 6A is superposed with the side frame 22, and the bolt insertion holes 54H of the ring base 54 are matched up with the bolt insertion holes 22H of the side frame 22. The retainer 46 is inserted between adjacent the tethers 56 and superposed with the ring base 54, and the bolt insertion holes 46H of the retainer 46 are matched up with the bolt insertion holes 54H of the ring base 54. A gas entry portion 41A of the first airbag 41R is connected with the inflator 43R inside the retainer 46 (see FIG. 7), and the first airbag 41R in the folded state is stowed inside the retainer 46. In this state, the bolts 58 penetrate through the bolt insertion holes 46H, 54H and 22H from a front face side of the flange 46F of the retainer 46, and the bolts 58 are screwed into the nuts (not shown in the drawings) at a back face side of the side frame 22. Thus, as shown in FIG. 6B, the ring base 54 is fastened by bolts to the side frame 22 together with the retainer 46.

Figure 6C:
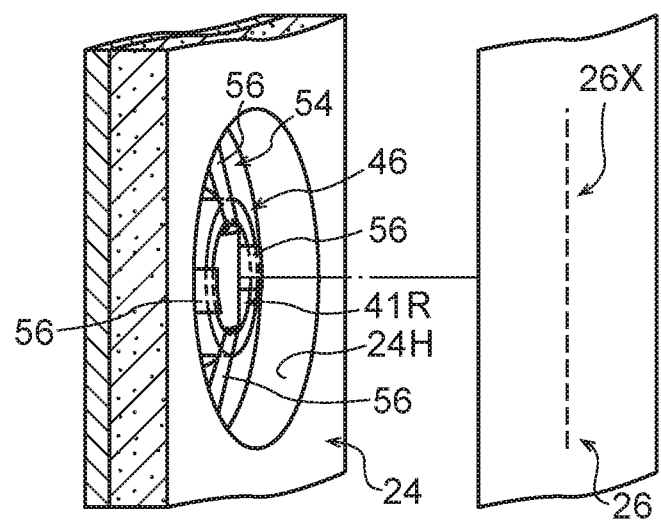

Then, as shown in FIG. 6C, the ring base 54, the retainer 46 and the tethers 56 are inserted into the insertion hole 24H of the cushion pad 24. The surface of the cushion pad 24 is covered with the seat skin 26, with the cut portion 26X of the seat skin 26 at a position corresponding with the insertion hole 24H of the cushion pad 24, and edges of the seat skin 26 are sewn up. The state in which the first airbag 41R has been stowed in this manner is shown in FIG. 7. In FIG. 7, the first airbag 41R and the inflator 43R are shown simplified.

According to the structure of the present exemplary embodiment described above, similar functions and operations to the first exemplary embodiment described above are provided, in addition to which operations and functions are provided by the provision of the tethers 56. These are described below.

Figure 9A:
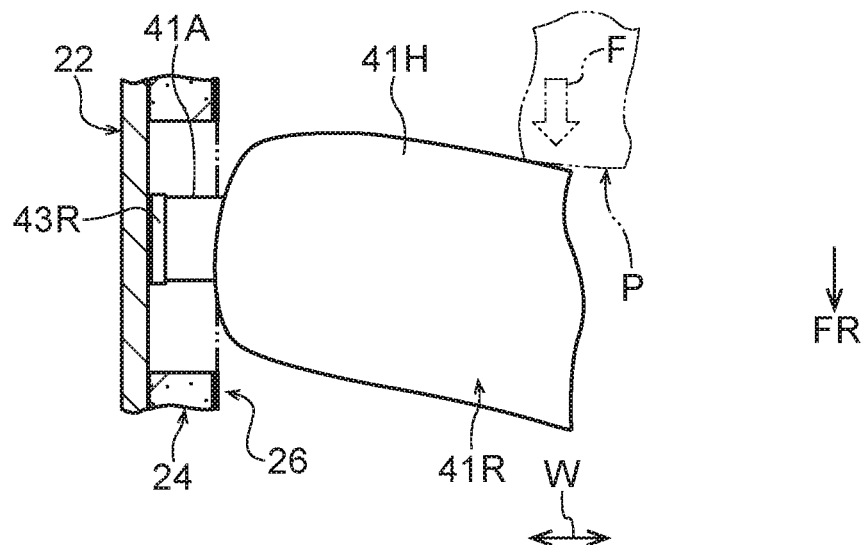
FIG. 9A and FIG. 9B are schematic sectional diagrams in plan view showing a comparison, between a structure without tethers and a structure with tethers, of operations when the main body portion of the first airbag in the inflated and expanded state is subjected to a load from the side thereof at which the seat occupant is located.
Figure 9B:
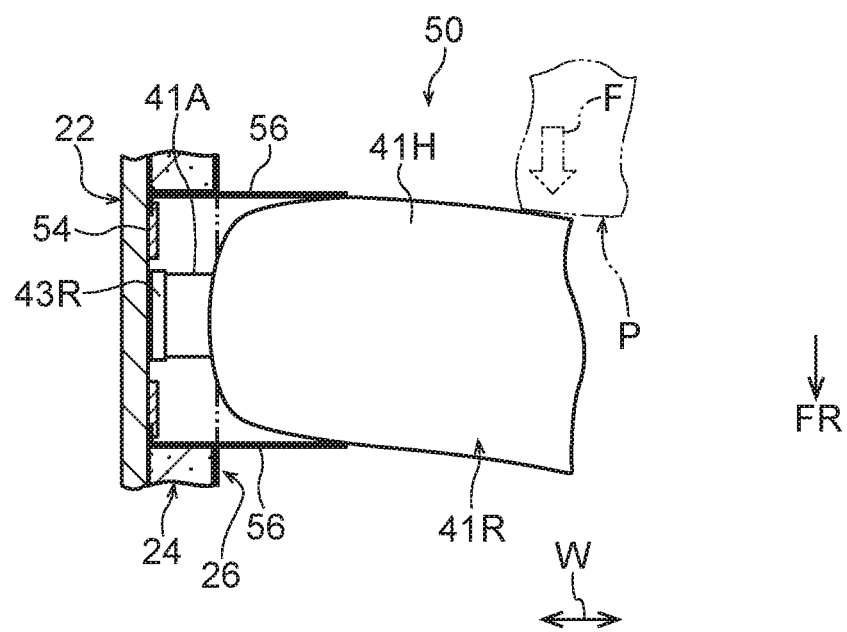

As shown in FIG. 8 and FIG. 9B, if the seat occupant P moves toward the seat front side due to inertia when a front collision occurs, the seat occupant P pushes the inflation distal end side of the main body portion 41H of the first airbag 41R toward the seat front side. As a result, a region at the proximal end side of the main body portion 41H of the first airbag 41R acts to tilt. In the present exemplary embodiment, however, the tilting of the region at the proximal end side of the main body portion 41H of the first airbag 41R may be suppressed by tension in the tethers 56. Consequently, the main body portion 41H of the first airbag 41R may more efficiently prevent the seat occupant P from moving toward the seat front side due to inertia.

A supplementary description is given through comparison with a structure in which no tethers are provided. FIG. 9A illustrates operation when the main body portion 41H of the first airbag 41R with the structure in which no tethers are provided, in the inflated and expanded state, is subjected to a load F from the side thereof at which the seat occupant P is located. As illustrated in FIG. 9A and FIG. 9B, with the structure of the present exemplary embodiment, tilting of the main body portion 41H of the first airbag 41R is suppressed compared to the structure in which no tethers are provided.

Although not shown in the drawings, because the tethers (56) are also provided at the first airbag 41L and the second airbags 42R and 42L (each shown in FIG. 1), similar operations are provided thereat. Therefore, in the inflated and expanded states of the first airbags 41R and 41L and the second airbags 42R and 42L, movement of the seat occupant P toward the seat front side due to inertia may be effectively inhibited by the first airbags 41R and 41L and the second airbags 42R and 42L (each shown in FIG. 1).

In the present exemplary embodiment, the tethers 56 shown in FIG. 5 are plurally provided at the single ring 54, the respective one ends of the tethers 56 are joined to regions at the proximal end side of the main body portion 41H of the first airbag 41R, and the respective other ends of the tethers 56 are fixed to the side frame 22 of the vehicle seat 12 (see FIG. 1) via the ring base 54. Therefore, ease of assembly is better than in a structure in which the respective other ends of the plural tethers 56 are fixed directly to the side frame 22 of the vehicle seat 12. That is, the plural tethers 56 may be easily attached with a simple structure. This similarly applies to the plural tethers (56) provided at the first airbag 41L and the second airbags 42R and 42L (each shown in FIG. 1). Moreover, because the ring base 54 is employed, weight is restrained compared to a structure in which a non-annular circular plate-shaped seat is employed instead of the ring base 54.

Third Exemplary Embodiment

Figure 10:
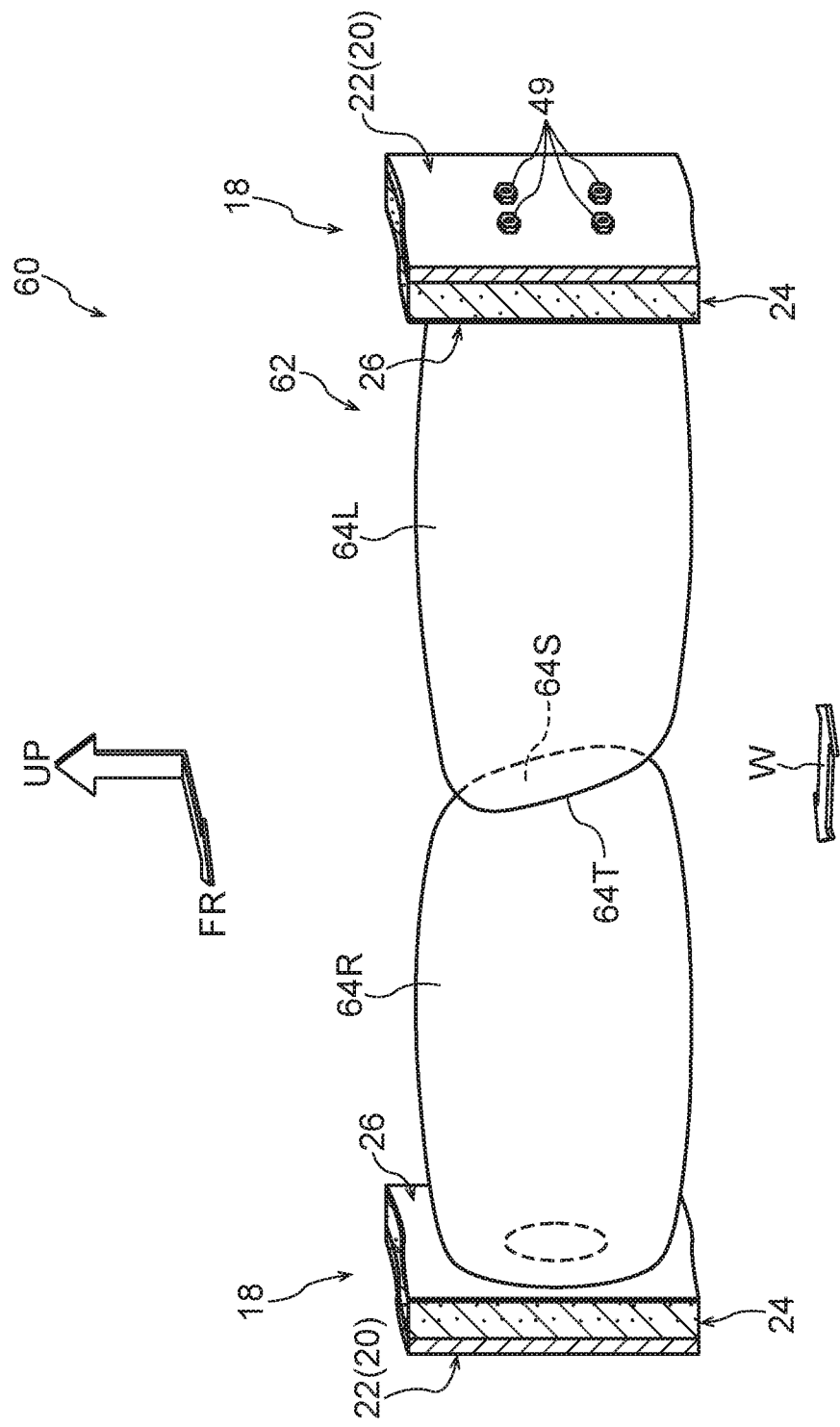
FIG. 10 is a perspective diagram showing an abutting state between first airbags of a vehicle occupant protection device according to a third exemplary embodiment of the present disclosure.

Now, a vehicle occupant protection device according to a second exemplary embodiment of the present disclosure is described using FIG. 10 with reference to FIG. 1. Structures of the present exemplary embodiment are substantially the same as in the first exemplary embodiment except in the respects described below. Therefore, structural portions that are substantially the same as in the first exemplary embodiment are assigned the same reference numerals and are not described.

FIG. 10 shows a perspective diagram of an abutting state between first airbags 64R and 64L of a vehicle occupant protection device 60 according to the present exemplary embodiment. An airbag apparatus 62 constituting a portion of the vehicle occupant protection device 60 has substantially the same structure as the airbag apparatus 40 according to the first exemplary embodiment (see FIG. 1) except in the respects described below.

The pair of first airbags 64R and 64L includes angled surfaces 64S and 64T that are formed such that the regions that push against one another in the seat width direction in the inflated and expanded states make contact at an angle. The first airbags 64R and 64L according to the present exemplary embodiment have similar structures to the first airbags 41R and 41L according to the first exemplary embodiment (see FIG. 2, etc.) except in the structures of regions at the inflation distal end sides. Moreover, in the present exemplary embodiment, second airbags are provided of which regions at the inflation distal end sides thereof are formed with similar shapes to the first airbags 64R and 64L shown in FIG. 10 in place of the regions at the inflation distal end sides of the second airbags 42R and 42L according to the first exemplary embodiment (see FIG. 1, etc.). That is, the pair of second airbags according to the present exemplary embodiment, which are not shown in the drawings, include angled surfaces that are formed such that the regions that push together in the seat width direction in the inflated and expanded states make contact at an angle With the structure of the present exemplary embodiment, the same operations and functions as in the first exemplary embodiment described above are provided. In addition, according to the structure of the present exemplary embodiment, a contact area between the first airbags 64R and 64L is enlarged and the first airbags 64R and 64L are harder to separate from one another. The contact area between the second airbags, which are not shown in the drawings, is also enlarged and the second airbags are harder to separate from one another. Consequently, a retention strength for retaining the seat occupant P from moving toward the seat front side due to inertia when a collision occurs (see FIG. 4) may be increased, and a case of the seat occupant P slipping through between the first airbags 64R and 64L and between the second airbags that are not shown in the drawings may be suppressed more effectively.

The angled surfaces 64S and 64T shown in FIG. 10 make contact with one another at an angle as seen from the seat front side. As a variant example of the present exemplary embodiment, the pair of first airbags and the pair of second airbags may include angled surfaces that are formed such that the regions that push against one another in the seat width direction in the inflated and expanded states make contact at angles as seen from the seat upper side.

Fourth Exemplary Embodiment

Figure 11:
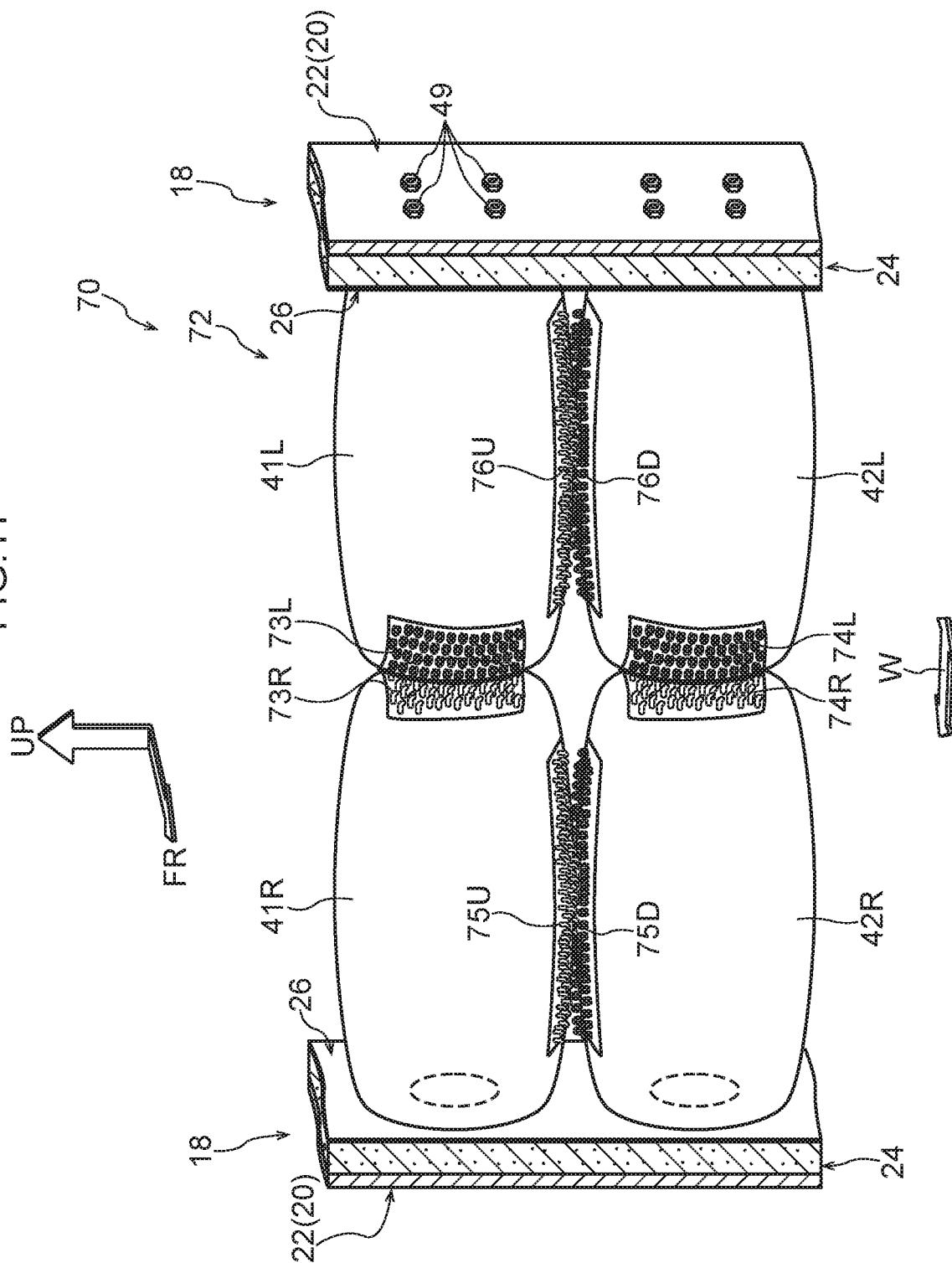
FIG. 11 is a perspective diagram showing a state in which first airbags and second airbags of a vehicle occupant protection device according to a fourth exemplary embodiment of the present disclosure have inflated and expanded.

Now, a vehicle occupant protection device according to a fourth exemplary embodiment of the present disclosure is described using FIG. 11 with reference to FIG. 1. Structures of the present exemplary embodiment are substantially the same as in the first exemplary embodiment except in the respects described below. Therefore, structural portions that are substantially the same as in the first exemplary embodiment are assigned the same reference numerals and are not described.

FIG. 11 shows a perspective diagram of a state in which the first airbags 41R and 41L and the second airbags 42R and 42L of a vehicle occupant protection device 70 according to the present exemplary embodiment have inflated and expanded. An airbag apparatus 72 constituting a portion of the vehicle occupant protection device 70 has substantially the same structure as the airbag apparatus 40 according to the first exemplary embodiment (see FIG. 1) except in the respects described below.

Hook and loop fasteners 73R and 73L are provided at the pair of first airbags 41R and 41L. The hook and loop fasteners 73R and 73L are capable of connecting the regions of the first airbags 41R and 41L that push against one another in the seat width direction in the inflated and expanded states. The hook and loop fasteners 73R and 73L are applied to the first airbags 41R and 41L. In addition, hook and loop fasteners 74R and 74L are provided at the pair of second airbags 42R and 42L. The hook and loop fasteners 74R and 74L are capable of connecting the regions of the second airbags 42R and 42L that push against one another in the seat width direction in the inflated and expanded states. The hook and loop fasteners 74R and 74L are applied to the second airbags 42R and 42L.

In the present exemplary embodiment, as an example, the hook and loop fasteners 73R and 74R at the seat right side are male hook and loop fasteners (one side of the hook and loop fasteners in which hook shaped fibers are implanted), and the hook and loop fasteners 73L and 74L at the seat left side are female hook and loop fasteners (one side of the hook and loop fasteners in which loop shaped fibers are implanted). However, the hook and loop fasteners that are applied to the regions at the inflation distal end sides of the first airbags 41R and 41L and the second airbags 42R and 42L may be different from the present exemplary embodiment, provided one of each pair is a female hook and loop fastener and the other is a male hook and loop fastener.

In the present exemplary embodiment, the first airbag 41R in the inflated and expanded state at the seat right side and the second airbag 42R in the inflated and expanded state at the seat right side are specified so as to be adjacent in the seat vertical direction. Hook and loop fasteners 75U and 75D are applied to the lower face side of the first airbag 41R and the upper side face of the second airbag 42R. The hook and loop fasteners 75U and 75D are capable of connecting regions of the first airbag 41R and second airbag 42R that make contact with one another in the inflated and expanded states thereof with one another. In addition in the present exemplary embodiment, the first airbag 41L in the inflated and expanded state at the seat left side and the second airbag 42L in the inflated and expanded state at the seat left side are specified so as to be adjacent in the seat vertical direction. Hook and loop fasteners 76U and 76D are applied to the lower face side of the first airbag 41L and the upper side face of the second airbag 42L. The hook and loop fasteners 76U and 76D are capable of connecting regions of the first airbag 41L and second airbag 42L that make contact with one another in the inflated and expanded states thereof with one another.

In the present exemplary embodiment, as an example, the hook and loop fasteners 75U and 76U are male hook and loop fasteners, and the hook and loop fasteners 75D and 76D are female hook and loop fasteners. However, the hook and loop fasteners that are applied to the regions at the lower face sides of the first airbags 41R and 41L and the upper face sides of the second airbags 42R and 42L may be different from the present exemplary embodiment, provided one of each pair is a female hook and loop fastener and the other is a male hook and loop fastener.

With the structure of the present exemplary embodiment, the same operations and functions as in the first exemplary embodiment described above are provided. In addition, according to the structure of the present exemplary embodiment, when the first airbags 41R and 41L are inflated and expanded, the regions thereof that push against one another at the seat width direction middle side are connected by the hook and loop fasteners 73R and 73L, and the first airbags 41R and 41L become harder to separate from one another. Similarly, when the second airbags 42R and 42L are inflated and expanded, the regions thereof that push against one another at the seat width direction middle side are connected by the hook and loop fasteners 74R and 74L, and the second airbags 42R and 42L become harder to separate from one another. Consequently, a retention strength for retaining the seat occupant P from moving toward the seat front side due to inertia when a collision occurs (see FIG. 4) may be increased, and a case of the seat occupant slipping through between the first airbags 41R and 41L and between the second airbags 42R and 42L may be more effectively suppressed.

Furthermore, according to the structure of the present exemplary embodiment, when the first airbags 41R and 41L and the second airbags 42R and 42L are inflated and expanded, the first airbag 41R at the right side and the second airbag 42R at the right side are connected by the hook and loop fasteners 75U and 75D, and the first airbag 41L at the left side and the second airbag 42L at the left side are connected by the hook and loop fasteners 76U and 76D. Therefore, the first airbag 41R at the right side and the second airbag 42R at the right side are harder to separate from one another, and the first airbag 41L at the left side and the second airbag 42L at the left side are harder to separate from one another. Consequently, the retention strength for retaining the seat occupant P from moving toward the seat front side due to inertia when a collision occurs (see FIG. 4) may be further increased.

As a variant example of the present exemplary embodiment, a structure may be employed in which the upper and lower pairs of hook and loop fasteners 75U, 75D, 76U and 76D are not provided.

Fifth Exemplary Embodiment

Figure 12A:
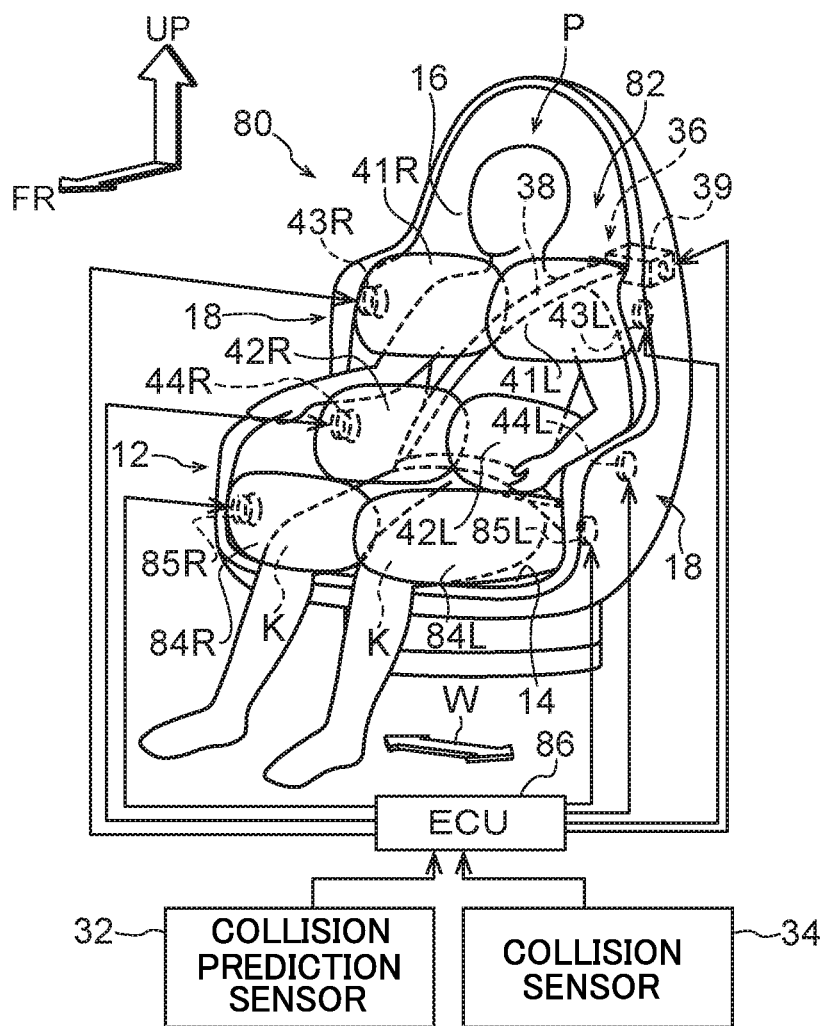
FIG. 12A and FIG. 12B are perspective diagrams showing a vehicle occupant protection device according to a fifth exemplary embodiment of the present disclosure.
Figure 12B:
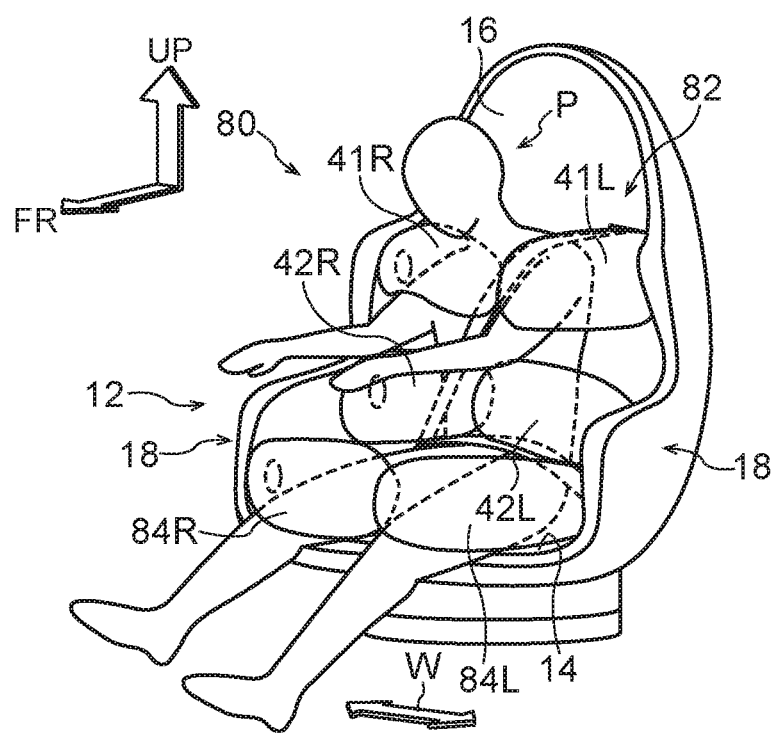

Now, a vehicle occupant protection device according to a fifth exemplary embodiment of the present disclosure is described using FIG. 12A and FIG. 12B. Structures of the present exemplary embodiment are substantially the same as in the first exemplary embodiment except in the respects described below. Therefore, structural portions that are substantially the same as in the first exemplary embodiment are assigned the same reference numerals and are not described.

FIG. 12A and FIG. 12B show perspective diagrams of a vehicle occupant protection device 80 according to the present exemplary embodiment. FIG. 12A shows inflated and expanded states of airbags, and FIG. 12B shows a state when a front collision occurs. An airbag apparatus 82 constituting a portion of the vehicle occupant protection device 80 has substantially the same structure as the airbag apparatus 40 according to the first exemplary embodiment (see FIG. 1) except in the respects described below.

In addition to the pair of first airbags 41R and 41L and the pair of second airbags 42R and 42L, the vehicle occupant protection device 80 according to the present exemplary embodiment is equipped with a pair of third airbags 84R and 84L. The third airbags 84R and 84L are stowed in respective folded states thereof in lower portions of the pair of side wall portions 18 of the vehicle seat 12. The third airbags 84R and 84L receive supplies of gas and are inflated and expanded towards the seat width direction inner sides thereof at the front side of a knee area K of the seat occupant P. The third airbags 84R and 84L that together form a pair are, for example, structured so as to push against one another at the seat width direction middle side of the vehicle seat 12 in the inflated and expanded states thereof.

Structures for causing the third airbags 84R and 84L to inflate and expand are similar to the structures for causing the first airbags 41R and 41L and the second airbags 42R and 42L to inflate and expand. Inflators 85R and 85L that cause the third airbags 84R and 84L to inflate and expand are electronically connected to an ECU 86. When a front collision is predicted on the basis of signals from the collision prediction sensor 32 or a front collision is detected on the basis of signals from the collision sensor 34, the ECU 86 controls to supply activation currents to the inflators 85R and 85L, activating the inflators 85R and 85L in order to inflate and expand the third airbags 84R and 84L. The ECU 86 is similar to the ECU 30 according to the first exemplary embodiment (see FIG. 1) except in the respects described above.

According to the present exemplary embodiment, in addition to the same operations and functions as the first exemplary embodiment described above, the following operation and function are provided. Because the pair of third airbags 84R and 84L are supplied with gas and inflate and expand towards the seat width direction inner sides thereof at the front side of the knee area K of the seat occupant P, movement due to inertia of the knee area K of the seat occupant P toward the seat front side when a collision occurs may be inhibited by the third airbags 84R and 84L. Thus, a retention strength on the lower half of the seat occupant P may be further improved by the third airbags 84R and 84L being additionally provided.

Sixth Exemplary Embodiment

A vehicle occupant protection device and an airbag control method according to a sixth exemplary embodiment of the present disclosure are described using FIG. 13A to FIG. 15. Structures of the present exemplary embodiment are substantially the same as in the first exemplary embodiment except in the respects described below. Therefore, structural portions that are substantially the same as in the first exemplary embodiment are assigned the same reference numerals and are not described.

Figure 13A:
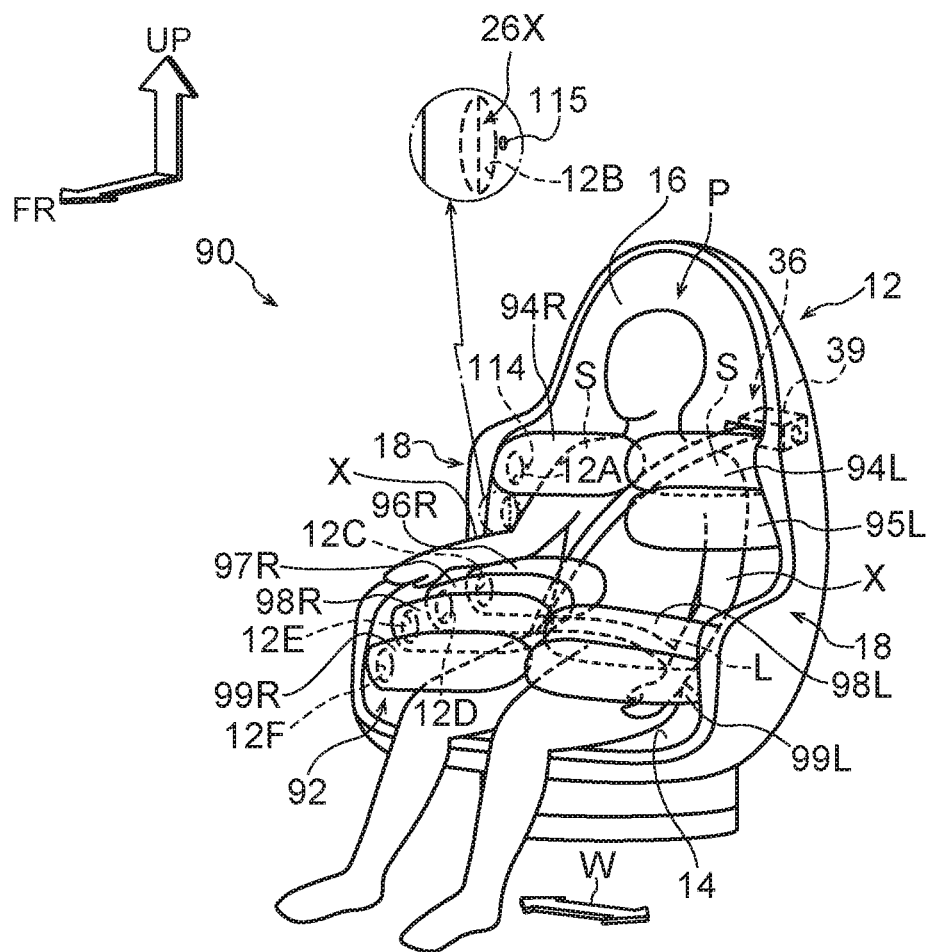
FIG. 13A and FIG. 13B are perspective diagrams showing a vehicle occupant protection device according to a sixth exemplary embodiment of the present disclosure.
Figure 13B:
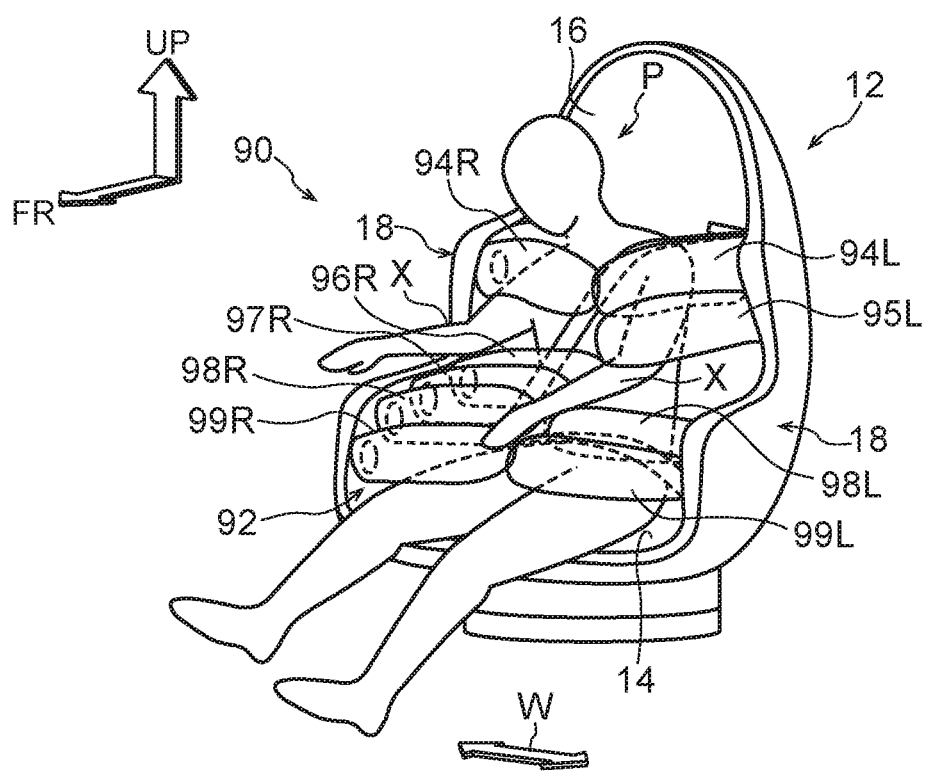
Figure 14:
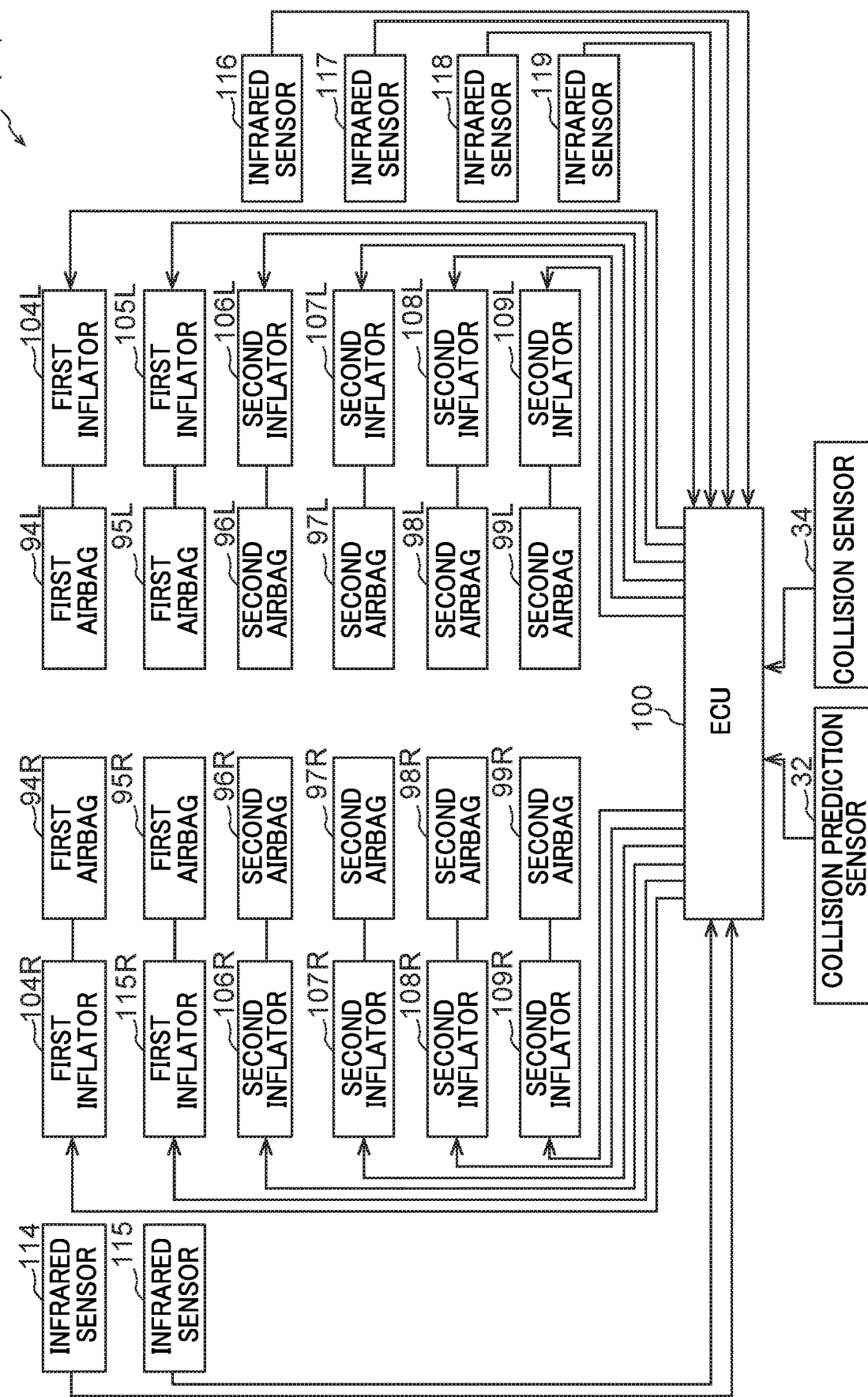
FIG. 14 is a block diagram showing schematic structures relating to airbag inflation and expansion control of an airbag apparatus constituting a portion of the vehicle occupant protection device in FIG. 13.

FIG. 13A and FIG. 13B show perspective diagrams of a vehicle occupant protection device 90 according to the present exemplary embodiment. FIG. 13A shows inflated and expanded states of airbags, and FIG. 13B shows a state when a front collision occurs. The reference symbol X shown in FIG. 13A and FIG. 13B indicates arms of the seat occupant P (i.e., limbs projecting from the shoulder area S of the seat occupant P). FIG. 14 shows a block diagram of schematic structures relating to airbag inflation and expansion control in an airbag apparatus 92 that constitutes a portion of the vehicle occupant protection device 90 in FIG. 13A and FIG. 13B.

As shown in FIG. 13A and FIG. 13B, the vehicle occupant protection device 90 is equipped with two pairs of first airbags 94R, 94L, 95R and 95L (the first airbag 95R is shown in FIG. 14). The first airbags 94R, 94L, 95R and 95L are stowed in folded states thereof, two each in opposing regions of the pair of side wall portions 18 of the vehicle seat 12, and are positioned at the seat front side relative to the shoulder area S of the seat occupant P in a seat side view. In the descriptions below, the first airbags 94R, 94L, 95R and 95L are referred to as "the first airbags 94R to 95L". Similarly to the first airbags 41R and 41L according to the first exemplary embodiment (see FIG. 1), the two pairs of first airbags 94R to 95L are supplied with gas and inflate and expand toward the seat width direction inner sides thereof. Each pair of the airbags in the inflated and expanded states are structured so as to push against one another at the seat width direction middle side of the vehicle seat 12. In FIG. 13A and FIG. 13B, the first airbag 95R (see FIG. 14) is in the stowed state, being stowed in a region that opposes the first airbag 95L in the seat width direction.

The vehicle occupant protection device 90 is further equipped with four pairs of second airbags 96R, 96L, 97R, 97L, 98R, 98L, 99R and 99L (the second airbags 96L and 97L are shown in FIG. 14). The second airbags 96R, 96L, 97R, 97L, 98R, 98L, 99R and 99L are stowed in folded states thereof, four each in opposing regions of the pair of side wall portions 18 of the vehicle seat 12, and are positioned at the seat front side relative to the waist area L of the seat occupant P in the seat side view. In the descriptions below, the second airbags 96R, 96L, 97R, 97L, 98R, 98L, 99R and 99L are referred to as "the second airbags 96R to 99L". Similarly to the second airbags 42R and 42L according to the first exemplary embodiment (see FIG. 1), the four pairs of second airbags 96R to 99L are supplied with gas and inflate and expand toward the seat width direction inner sides thereof. Each pair of the airbags in the inflated and expanded states are structured so as to push against one another at the seat width direction middle side of the vehicle seat 12. In FIG. 13A and FIG. 13B, the second airbags 96L and 97L (see FIG. 14) are in the stowed state, being stowed in regions that oppose the second airbags 96R and 97R in the seat width direction.

Structures for causing the first airbags 94R to 95L and the second airbags 96R to 99L in FIG. 13A to FIG. 14 to inflate and expand are similar to the structures for causing the first airbags 41R and 41L and the second airbags 42R and 42L shown in FIG. 1 and the like to inflate and expand. As shown in FIG. 14, first inflators 104R, 104L, 105R and 105L (referred to as "the first inflators 104R to 105L") are connected to the first airbags 94R to 95L, and second inflators 106R, 106L, 107R, 107L, 108R, 108L, 109R and 109L (referred to as "the second inflators 106R to 109L") are connected to the second airbags 96R to 99L. The first inflators 104R to 105L and the second inflators 106R to 109L are electronically connected to an ECU 100. Activations of the first inflators 104R to 105L and the second inflators 106R to 109L, which are described below, are controlled by the ECU 100.

Similarly to the ECU 30 according to the first exemplary embodiment (see FIG. 1), the ECU 100 is electronically connected to the collision prediction sensor 32 and the collision sensor 34, and is electronically connected to the pretensioner (not shown in the drawings) of the retractor 39 (see FIG. 13A).

In the present exemplary embodiment, as shown in FIG. 13A, infrared sensors 114 and 115 that serve as sensors are provided at the side wall portion 18 at the seat right side, in vicinities at the seat rear side (the side at which the seat occupant P is located) relative to respective airbag expansion apertures 12A and 12B of the first airbags 94R and 95R (see FIG. 14). The infrared sensors 114 and 115 depicted in FIG. 14 are capable of detecting when an arm X (each of which are shown in FIG. 13A) of the seat occupant P is located in an expected region of inflation and expansion of the nearest of the first airbags 94R and 95R. The infrared sensors 114 and 115 are electronically connected to the ECU 100.

Infrared sensors 116, 117, 118 and 119 that serve as sensors (below referred to as "the infrared sensors 116 to 119") are provided at the side wall portion 18 at the seat left side (see FIG. 13A). The infrared sensors are provided in vicinities at the seat rear side (the side at which the seat occupant is located) relative to respective airbag expansion apertures of the second airbags 96L, 97L, 98L and 99L (airbag expansion apertures, which are not shown in the drawings, that oppose airbag expansion apertures 12C, 12D, 12E and 12F in FIG. 13A in the seat width direction). The infrared sensors 116 to 119 are capable of detecting when an arm X (each of which are shown in FIG. 13A) of the seat occupant P is located in an expected region of inflation and expansion of the nearest of the second airbags 96L, 97L, 98L and 99L. The infrared sensors 116 to 119 are electronically connected to the ECU 100.

Now, an airbag control method for the vehicle occupant protection device 90 according to the present exemplary embodiment is described with reference to the flowchart shown in FIG. 15. In this airbag control method, the ECU 100 controls respective inflation and expansion of the first airbags 94R to 95L and the second airbags 96R to 99L by controlling activation of the first inflators 104R to 105L and the second inflators 106R to 109L.

First, in step 200 of the airbag inflation and expansion control processing shown in FIG. 15, a determination is made as to whether a front collision of the vehicle has been detected or predicted. When the result of the determination in step 200 is negative, the execution of step 200 is repeated until a collision is predicted or detected. When the result of the determination in step 200 is affirmative, the ECU 100 proceeds to step 202.

In step 202, the ECU 100 makes a determination as to whether the infrared sensors 114, 115, 116, 117, 118 and 109 (below referred to as the infrared sensors 114 to 119) have detected an arm X of a seat occupant P in one or more of the plural expected inflation and expansion regions of the airbags. When the result of the determination in step 202 is negative (a first case in which the infrared sensors 114 to 119 do not detect an arm X of the seat occupant P in any of the plural expected inflation and expansion regions), the ECU 100 proceeds to step 204. When the result of the determination in step 202 is affirmative (a second case in which the infrared sensors 114 to 119 detect an arm X of the seat occupant P in at least one of the plural expected inflation and expansion regions), the ECU 100 proceeds to step 206.

In step 204, the ECU 100 activates the first inflators 104R to 105L and the second inflators 106R to 109L such that all of the first airbags 94R to 95L and the second airbags 96R to 99L are inflated and expanded.

Alternatively, in step 206, in accordance with a pre-specified standard, the ECU 100 prohibits inflation and expansion of at least one of the first airbags 94R to 95L and second airbags 96R to 99L in whose expected inflation and expansion region(s) the arm X of the seat occupant P has been detected. Further, in step 206, the ECU 100 controls activation of the first inflators 104R to 105L and the second inflators 106R to 109L such that at least one pair of the first airbags (for example, at least the pair of first airbags 94R and 94L) and at least one pair of the second airbags (for example, at least the pair of second airbags 98R and 98L) are inflated and expanded. The "pre-specified standard" according to the present exemplary embodiment is described in specific terms below.

Here, in step 206, in a case in which at least a pair of the first airbags can be inflated and expanded, even when all of the first airbags 94R to 95L in whose expected inflation and expansion regions the arm X of the seat occupant P has been detected are prohibited to inflate and expand, the ECU 100 controls activation of the first inflators 104R to 105L, so as to prohibit inflation and expansion of all of the first airbags 94R to 95L in whose expected inflation and expansion regions the arm X of the seat occupant P is detected, and to inflate and expand the other airbags of the first airbags 94R to 95L.

Further, in step 206, in a case in which at least one pair of the first airbags 94R to 95L cannot be inflated and expanded when all of the first airbags 94R to 95L in whose expected inflation and expansion regions the arm X of the seat occupant P has been detected are prohibited to inflate and expand, the ECU 100 controls activation of the first inflators 104R to 105L, so as to inflate and expand a pre-specified pair of the first airbags (for example, the pair of first airbags 94R and 94L), prohibit inflation and expansion of the others of the first airbags 94R to 95L in whose expected inflation and expansion regions the arm X of the seat occupant P has been detected, and to inflate and expand the rest of the first airbags 94R to 95L.

Further, in step 206, in a case in which a pair of the second airbags can be inflated and expanded, even when all of the second airbags 96R to 99L in whose expected inflation and expansion regions the arm X of the seat occupant P has been detected are prohibited to inflate and expand, the ECU 100 controls activation of the second inflators 106R to 109L, so as to prohibit inflation and expansion of all of the second airbags 96R to 99L in whose expected inflation and expansion regions the arm X of the seat occupant P is detected, and to inflate and expand the other airbags of the second airbags 96R to 99L.

Furthermore, in step 206, in a case in which at least one pair of the second airbags 96R to 99L cannot be inflated and expanded when all of the second airbags 96R to 99L in whose expected inflation and expansion regions the arm X of the seat occupant P has been detected are prohibited to inflate and expand, the ECU 100 controls activation of the second inflators 106R to 109L, so as to inflate and expand a pre-specified pair of the second airbags (for example, the pair of second airbags 98R and 98L), prohibit inflation and expansion of the others of the second airbags 96R to 99L in whose expected inflation and expansion regions the arm X of the seat occupant P has been detected, and to inflate and expand the rest of the second airbags 96R to 99L.

Accordingly, in the present exemplary embodiment, restraint of the seat occupant P when a collision occurs may be improved, while interference between the airbags and the arms X of the seat occupant P may be suppressed.

Seventh Exemplary Embodiment

Now, a vehicle occupant protection device according to a seventh exemplary embodiment of the present disclosure is described using FIG. 16. Structures of the present exemplary embodiment are substantially the same as in the first exemplary embodiment except in the respects described below. Therefore, structural portions that are substantially the same as in the first exemplary embodiment are assigned the same reference numerals and are not described.

Figure 16A:
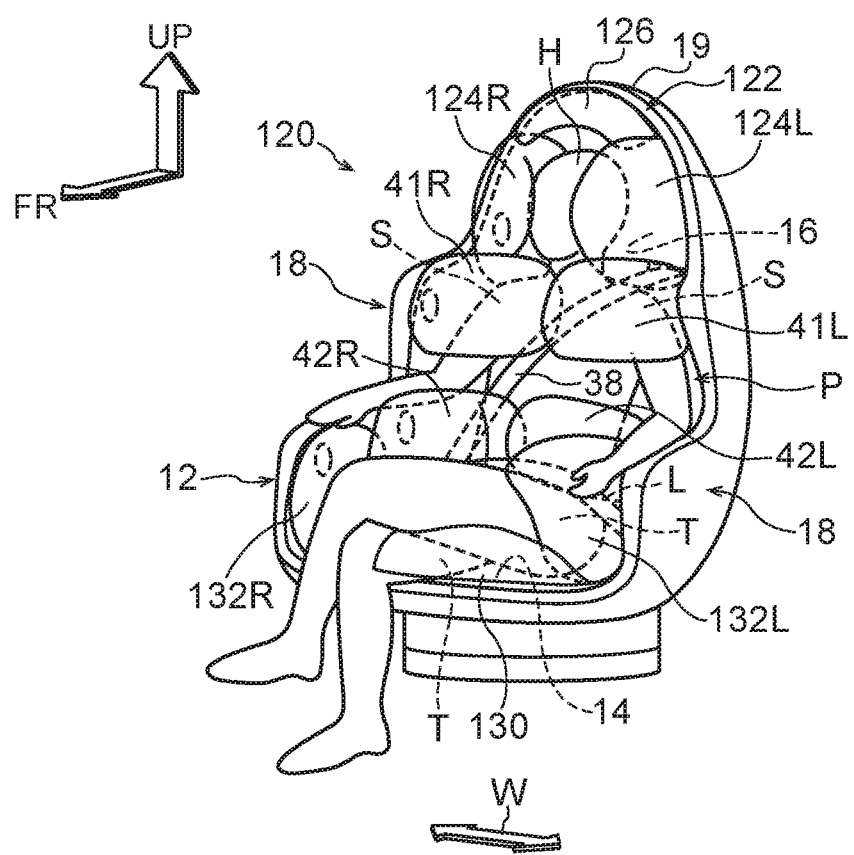
FIG. 16A and FIG. 16B are perspective diagrams showing a vehicle occupant protection device according to a seventh exemplary embodiment of the present disclosure.
Figure 16B:
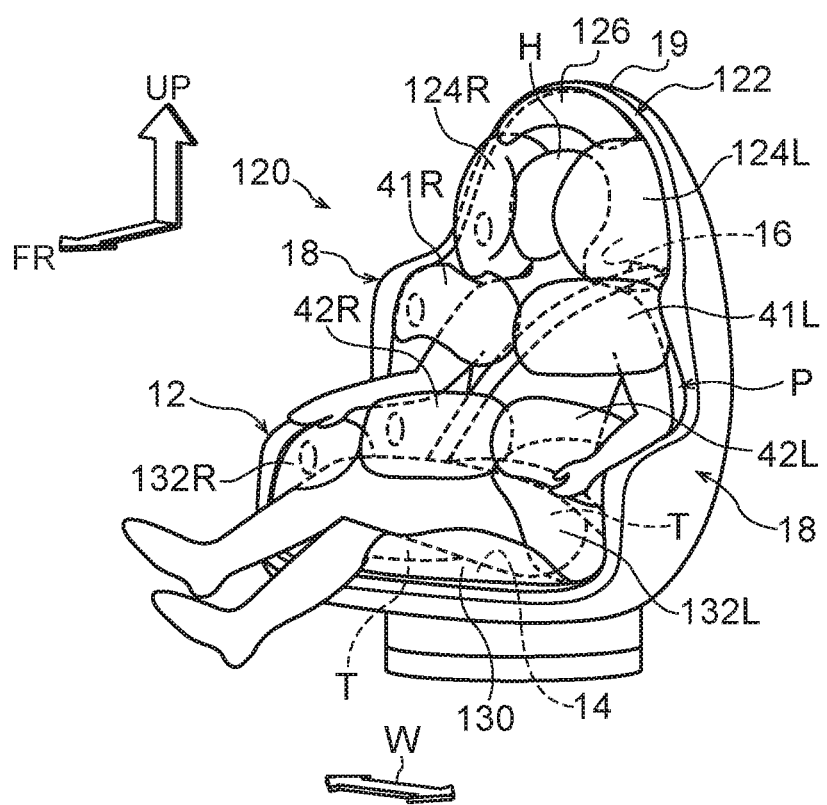

FIG. 16A and FIG. 16B show perspective diagrams of a vehicle occupant protection device 120 according to the present exemplary embodiment. FIG. 16A shows inflated and expanded states of airbags, and FIG. 16B shows a state when a collision occurs. An airbag apparatus 122 constituting a portion of the vehicle occupant protection device 120 has substantially the same structure as the airbag apparatus 40 according to the first exemplary embodiment (see FIG. 1) except in the respects described below.

In addition to the pair of first airbags 41R and 41L and the pair of second airbags 42R and 42L, the vehicle occupant protection device 120 according to the present exemplary embodiment is equipped with a plural number of auxiliary airbags 124R, 124L, 126, 130, 132R and 132L (below referred to as "the auxiliary airbags 124R to 132L"). The auxiliary airbags 124R to 132L are stowed in respective folded states thereof in the vehicle seat 12. The auxiliary airbags 124R to 132L receive supplies of gas and are inflated and expanded into gaps between the vehicle seat 12 and the seat occupant P.

A left and right pair of the auxiliary airbags 124R and 124L, which are for protecting the head area of the seat occupant P, are respectively stowed in upper portions of the pair of side wall portions 18 of the vehicle seat 12, and are inflated and expanded into gaps between the upper portions of the side wall portions 18 and side face sides of the head area H of the seat occupant P. The auxiliary airbag 126, which is also for protecting the head area of the seat occupant P, is stowed at an upper end portion side of the seatback 16, and is inflated and expanded into a gap between a hood-shaped portion 19, which links between upper ends of the pair of left and right side wall portions 18, and the upper face side of the head area H of the seat occupant P.

The auxiliary airbag 130, which is for protecting the lower half of the body of the seat occupant P, is stowed in the seat cushion 14 of the vehicle seat 12, and is inflated and expanded into a gap between the seat cushion 14 and a back face side of a thigh area T of the seat occupant P. A left and right pair of the auxiliary airbags 132R and 132L, which are for protecting the lower half of the seat occupant P, are respectively stowed in lower portions of the pair of side wall portions 18 of the vehicle seat 12, and are inflated and expanded into gaps between the side wall portions 18 and side face sides at the outer sides of the thigh area T of the seat occupant P.

Structures for causing the auxiliary airbags 124R to 132L to inflate and expand are similar to the structures for causing the first airbags 41R and 41L and the second airbags 42R and 42L to inflate and expand. Inflators (not shown in the drawings) that cause the auxiliary airbags 124R to 132L to inflate and expand are electronically connected to an ECU (not shown in the drawings). When a collision (which may be a front collision) is predicted on the basis of signals from the collision prediction sensor 32 (see FIG. 1) or a collision (which may be a front collision) is detected on the basis of signals from the collision sensor 34 (see FIG. 1), this ECU controls to supply activation currents to the inflators, activating the inflators in order to inflate and expand the auxiliary airbags 124R to 132L. This ECU is similar to the ECU 30 according to the first exemplary embodiment (see FIG. 1) except in the respects described above.

According to the present exemplary embodiment, in addition to the same operations and functions as the first exemplary embodiment described above, the following operation and function are provided. The plural auxiliary airbags 124R to 132L receive supplies of gas and are inflated and expanded into the gaps between the vehicle seat 12 and the seat occupant P. Consequently, retention strength of the seat occupant P may be improved in regard to a variety of collision modes.

As a variant example of the exemplary embodiments described above, a structure may be employed in which the first airbags and the second airbags are specified with the diameters of the gas entry portions structuring the proximal end portions thereof being the same as the diameters of the main body portions.

In the second exemplary embodiment described above, as shown in FIG. 5 and the like, the tethers 56 are employed as the tilt suppression member. However, cord-shaped members may be employed as the tilt suppression member instead of the tethers 56. In the second exemplary embodiment described above, end portions of the tethers 56 serving as the tilt suppression member are fixed to the side frame 22 via the ring base 54. However, a structure may be employed in which the ring base 54 is not interposed but the end portion of each tilt suppression member is fixed directly to the side frame 22.

In the second exemplary embodiment described above, four of the tethers 56 are provided at each of the first airbags 41R and 41L and the second airbags 42R and 42L. However, the number of tethers at each of the first airbags and the second airbags may be a number other than four. For example, three of the tethers may be provided at each of the first airbags and the second airbags, in which case the tethers may be provided at each of the first airbags and the second airbags at, for example, the seat rear side and the upper and lower sides of the seat vertical direction.

In the fourth exemplary embodiment described above, as shown in FIG. 11, the hook and loop fasteners 73R, 73L, 74R, 74L, 75U, 75D, 76U and 76D that are separate bodies are applied to the first airbags 41R and 41L and the second airbags 42R and 42L. However, a structure may be employed in which, instead of these hook and loop fasteners being applied, for example, hook and loop fibers of the hook and loop fasteners are implanted directly on the first airbags and the second airbags (which is to say a structure in which the airbags and the hook and loop fasteners are made integral).

In the fifth exemplary embodiment described above, as shown in FIG. 12, the third airbags 84R and 84L that form a pair are structured so as to push against one another at the seat width direction middle side of the vehicle seat 12 in the inflated and expanded states. However, a structure may be employed in which the third airbags 84R and 84L forming a pair are disposed to be separated in the seat width direction in the inflated and expanded states.

In the sixth exemplary embodiment described above, as shown in FIG. 14, the infrared sensors 114 and 115 are provided at one side (the seat right side) of the two pairs of first airbags 94R to 95L. However, infrared sensors may be provided at the other side (the seat left side) of the two pairs of first airbags 94R to 95L, or infrared sensors may be provided at both sides of the two pairs of first airbags 94R to 95L. Furthermore, in the sixth exemplary embodiment described above, the infrared sensors 116 to 119 are provided at one side (the seat left side) of the four pairs of second airbags 96R to 99L. However, infrared sensors may be provided at the other side (the seat right side) of the four pairs of second airbags 96R to 99L, or infrared sensors may be provided at both sides of the four pairs of second airbags 96R to 99L. As further examples, structures may be employed in which any of the infrared sensors 116 to 119 are omitted. Further yet, an image sensor may be provided to serve as the sensors instead of the infrared sensors 114 to 119 according to the sixth exemplary embodiment described above.

As a variant example of the sixth exemplary embodiment described above, in step 206 shown in FIG. 15, in a case in which at least one pair of the first airbags 94R to 95L cannot be inflated and expanded when all of the first airbags 94R to 95L in whose expected inflation and expansion regions the arm X of the seat occupant P has been detected are prohibited to inflate and expand, the ECU 100 may control activation of the first inflators 104R to 105L so as to inflate and expand a pre-specified pair of the first airbags (for example, the pair of first airbags 94R and 94L) and uniformly prohibit inflation and expansion of the rest of the first airbags 94R to 95L.

Similarly, as a variant example of the sixth exemplary embodiment described above, in step 206, in a case in which at least one pair of the second airbags 96R to 99L cannot be inflated and expanded when all of the second airbags 96R to 99L in whose expected inflation and expansion regions the arm X of the seat occupant P has been detected are prohibited to inflate and expand, the ECU 100 controls activation of the second inflators 106R to 109L so as to inflate and expand a pre-specified pair of the second airbags (for example, the pair of second airbags 98R and 98L) and uniformly prohibit inflation and expansion of the rest of the second airbags 96R to 99L.

As a variant example of the exemplary embodiments described above, the inflators for inflating and expanding the first airbags and the second airbags may be provided inside the first airbags and second airbags and fixed to the sides of side wall portions of a vehicle seat at which frames are disposed.

The structures of the exemplary embodiments described above may be applied to vehicles capable of autonomous driving in which swivel-type vehicle seats are installed.

The exemplary embodiments and variant examples described above may be embodied in combinations as appropriate.

Hereabove, examples of the present disclosure have been described. The present disclosure is not limited by these descriptions and it will be clear that numerous modifications beyond these descriptions may be embodied within a technical scope not departing from the gist of the disclosure.

What is claimed is:
1. A vehicle occupant protection device comprising:
 a vehicle seat including:
  a seat cushion,
  a seatback, side wall portions that protrude respectively from seat width direction outer side end portions of the seatback toward a seat front side to positions, in a seat side view, at the seat front side relative to a shoulder area and a waist area of a seat occupant, and a plurality of apertures provided at seat width direction inner side surfaces of the side wall portions;

a pair of first airbags respectively stowed in opposing regions of the side wall portions of the vehicle seat and positioned, in the seat side view, at the seat front side relative to the shoulder area of the seat occupant; and a pair of second airbags respectively stowed in opposing regions of the side wall portions of the vehicle seat and positioned, in the seat side view, at the seat front side relative to the waist area of the seat occupant, wherein:

the first airbags and the second airbags are supplied with gas and are inflated and expanded toward seat width direction inner sides thereof, and, in inflated and expanded states, each pair of airbags push against one another at a seat width direction middle side of the vehicle seat; and each of the first airbags and each of the second airbags is configured to inflate and expand from a corresponding aperture among the plurality of apertures.

2. The vehicle occupant protection device according to claim 1, wherein:

each of the first airbags and the second airbags includes a main body portion and a gas entry portion that protrudes from a portion of the main body portion and structures a proximal end portion side;

a diameter of the main body portion is larger than a diameter of the gas entry portion; and a tilt suppression member is provided at each airbag, the tilt suppression member connecting the proximal end side of the main body portion with a side of the side wall portion of the vehicle seat at which a frame is disposed, and the tilt suppression member suppressing, by tension, tilting of a region at the proximal end side of the main body portion, when the main body portion in an inflated and expanded state is subjected to a load from a side thereof at which the seat occupant is located.

3. The vehicle occupant protection device according to claim 2, wherein the tilt suppression member includes a plurality of tethers being provided at a ring base, each tether including one end joined to a portion at the proximal end side of the main body portion and another end fixed to the frame of the side wall portion of the vehicle seat via the ring base.

4. The vehicle occupant protection device according to claim 1, wherein each of the first airbags and the second airbags includes an angled surface formed such that respective regions of the airbags that push against one another in the seat width direction in inflated and expanded states make contact at an angle.

5. The vehicle occupant protection device according to claim 1, wherein hook and loop fasteners are provided at each of the first airbags and the second airbags, the hook and loop fasteners connecting respective regions of the airbags that push against one another in the seat width direction in the inflated and expanded states.

6. The vehicle occupant protection device according to claim 1, further comprising a pair of third airbags respectively stowed at lower portions of the pair of side wall portions of the vehicle seat, the pair of third airbags being supplied with gas and inflated and expanded towards seat width direction inner sides thereof at a front side of a knee area of the seat occupant.

7. The vehicle occupant protection device according to claim 1, further comprising an auxiliary airbag stowed in the vehicle seat, the auxiliary airbag being supplied with gas and inflated and expanded into a gap between the vehicle seat and the seat occupant.

8. An airbag control method for a vehicle occupant protection device according to claim 1, wherein the vehicle occupant protection device includes:

at least two pairs each of the first airbags and the second airbags; and sensors, provided at the side wall portions, that detect a location of an arm of the seat occupant in pre-specified expected inflation and expansion regions, among a plurality of expected inflation and expansion regions of the first airbags and the second airbags, the airbag control method comprising:

in a first case in which the sensors do not detect the arm of the seat occupant in any of the plurality of expected inflation and expansion regions when a front collision of the vehicle is detected or predicted, inflating and expanding all of the first airbags and the second airbags; and in a second case in which the sensors detect the arm of the seat occupant in at least one of the expected inflation and expansion regions when a front collision of the vehicle is detected or predicted, in accordance with a pre-specified standard:

prohibiting inflation and expansion of at least one of the first airbags and second airbags in whose expected inflation and expansion regions the arm of the seat occupant is detected, and inflating and expanding at least one pair of the first airbags and at least one pair of the second airbags.

9. The airbag control method according to claim 8, comprising:

in the second case, and in a case in which at least one pair of the first airbags can be inflated and expanded even when all of the first airbags in whose expected inflation and expansion regions the arm of the seat occupant is detected are prohibited to inflate and expand:

prohibiting inflation and expansion of all of the first airbags in whose expected inflation and expansion regions the arm of the seat occupant is detected; and inflating and expanding others of the first airbags, and in the second case, and in a case in which at least one pair of the second airbags can be inflated and expanded even when all of the second airbags in whose expected inflation and expansion regions the arm of the seat occupant is detected are prohibited to inflate and expand:

prohibiting inflation and expansion of all of the second airbags in whose expected inflation and expansion regions the arm of the seat occupant is detected; and inflating and expanding others of the second airbags.

10. An airbag folding method for an airbag provided at a vehicle occupant protection device according to claim 1, the airbag configured to be inflated and expanded toward a seat width direction inner side along a long side direction of a flat unfolded state of the airbag, the airbag folding method comprising:

from the flat unfolded state, folding an end portion side in a short side direction of the airbag to the inner side in the short side direction; and after the folding to the inner side, folding the airbag into a roll shape from a distal end side toward a proximal end side in the long side direction.

* * * * *